(12) United States Patent
Hagiwara et al.

(10) Patent No.: US 6,987,717 B2
(45) Date of Patent: Jan. 17, 2006

(54) OPTICAL DISK DEVICE RECORDING DATA ON A RECORDABLE OR REWRITABLE OPTICAL DISK BY SETTING A RECORDING VELOCITY AND A RECORDING POWER FOR EACH OF ZONES ON AN OPTICAL DISK

(75) Inventors: Kei Hagiwara, Kanagawa (JP); Haruyuki Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 523 days.

(21) Appl. No.: 09/923,540

(22) Filed: Aug. 8, 2001

(65) Prior Publication Data

US 2002/0044507 A1 Apr. 18, 2002

(30) Foreign Application Priority Data

Aug. 10, 2000 (JP) ............................. 2000-241958
Nov. 29, 2000 (JP) ............................. 2000-363383

(51) Int. Cl.
*G11B 7/00* (2006.01)

(52) U.S. Cl. ................ 369/47.53; 369/116; 369/47.54; 369/47.52; 369/53.26

(58) Field of Classification Search ............... 369/47.5, 369/47.51, 47.52, 47.53, 116, 53.26
See application file for complete search history.

(56) References Cited

U.S. PATENT DOCUMENTS

| | | | |
|---|---|---|---|
| 5,436,880 A * | 7/1995 | Eastman et al. | 369/47.51 |
| 5,502,702 A * | 3/1996 | Nakajo | 369/47.53 |
| 5,537,370 A | 7/1996 | Shigematsu et al. | |
| 5,592,463 A * | 1/1997 | Muramatsu et al. | 369/47.53 |
| 5,784,348 A * | 7/1998 | Eastman et al. | 369/47.5 |
| 5,796,711 A | 8/1998 | Tomita et al. | |
| 5,872,763 A * | 2/1999 | Osakabe | 369/47.53 |
| 5,903,537 A * | 5/1999 | Gage et al. | 369/116 |
| 5,974,021 A * | 10/1999 | Toda et al. | 369/116 |
| 6,052,347 A * | 4/2000 | Miyata | 369/47.53 |
| 6,222,815 B1 * | 4/2001 | Nagano | 369/47.53 |
| 6,704,269 B1 * | 3/2004 | Ogawa | 369/116 |

FOREIGN PATENT DOCUMENTS

| | | |
|---|---|---|
| EP | 0- 762 404 A1 | 3/1997 |
| JP | 07-057268 | 3/1995 |
| JP | 07111045 | 4/1995 |

(Continued)

*Primary Examiner*—Gautam R. Patel
*Assistant Examiner*—J. L. Ortiz-Criado
(74) *Attorney, Agent, or Firm*—Dickstein Shapiro Morin & Oshinsky LLP

(57) ABSTRACT

An information recording device for writing information in a circumferential direction of a disk-type recording medium, with a substantially constant linear density. The device performs a test-writing in a predetermined area on the disk-type recording medium at a predetermined basic linear velocity so as to determine an optimum recording power according to a result of the test-writing and stores a value in accordance with a reproduction signal reproduced from the disk-type recording medium as an optimum recording-state targeted value, sets a recording power according to a result of a predetermined calculation performed to the optimum recording power and sets a recording-state targeted value according to a result of a predetermined calculation performed to the optimum recording-state targeted value when a recording is performed at a linear velocity different from the predetermined basic linear velocity, and corrects the recording power by comparing the recording-state targeted value with the value during a recording of information to the disk-type recording medium.

6 Claims, 20 Drawing Sheets

FOREIGN PATENT DOCUMENTS

| | | |
|---|---|---|
| JP | 09288825 | 4/1997 |
| JP | 09231576 | 5/1997 |
| JP | 09-270128 | 10/1997 |
| JP | 09305973 | 11/1997 |
| JP | 10-49990 | 2/1998 |
| JP | 11025575 | 1/1999 |
| JP | 11-296858 | 10/1999 |
| JP | 2000020957 A * | 1/2000 |
| JP | 2000-40302 | 2/2000 |
| JP | 2000-215454 | 8/2000 |
| JP | 2001-216643 | 8/2001 |
| JP | 2001-344751 | 12/2001 |

\* cited by examiner

| Pw (mW) | beta (%) | B |
|---|---|---|
| 10 | −20 | 1000 |
| 11 | −14 | 800 |
| 12 | −12 | 700 |
| 13 | −8 | 500 |
| 14 | −3 | 450 |
| 15 | 1 | 400 |
| 16 | 5 | 380 |
| 17 | 7 | 340 |
| 18 | 10 | 310 |
| 19 | 13 | 280 |

| TYPE | VELOCITY (x) | F1 | F2 | theta (T) |
|---|---|---|---|---|
| 1 | 12 | 1.00 | 1.00 | 0.00 |
| 1 | 16 | 1.10 | 1.00 | 0.10 |
| 1 | 20 | 1.15 | 1.00 | 0.20 |
| 1 | 24 | 1.20 | 1.00 | 0.30 |
| 2 | 12 | 1.00 | 1.00 | 0.10 |
| 2 | 16 | 1.20 | 1.10 | 0.10 |
| 2 | 20 | 1.40 | 1.20 | 0.10 |
| 2 | 24 | 1.60 | 1.30 | 0.20 |
| ... | ... | ... | ... | ... |

FIG.24

| MANUFACTURER ID CODE | TYPE CODE | RECORDING PARAMETER NUMBER |
|---|---|---|
| A | 0 | 1 |
| A | 1 | 1 |
| A | 2 | 2 |
| A | ... | ... |
| B | 0 | 3 |
| B | 1 | 4 |
| B | 2 | 4 |
| B | ... | ... |
| ... | ... | ... |

OPTICAL DISK DEVICE RECORDING DATA ON A RECORDABLE OR REWRITABLE OPTICAL DISK BY SETTING A RECORDING VELOCITY AND A RECORDING POWER FOR EACH OF ZONES ON AN OPTICAL DISK

BACKGROUND OF THE INVENTION

1. Field of the Invention

The present invention generally relates to an optical disk device, an information processing device, an optical disk recording method, a constant estimating method, and an information recording device, and more particularly, to an optical disk device, an information processing device, an optical disk recording method, a constant estimating method, and an information recording device which record data on a disk-type recording medium, such as a recordable or rewritable optical disk.

2. Description of the Related Art

It is well known that recording formats for an optical disk include a CLV (Constant Linear Velocity) type in which a data row (a data train) on an optical disk is at a constant velocity when viewed from an optical pickup, and a CAV (Constant Angular Velocity) type in which an angular velocity of an optical disk is constant.

As for the optical disk of the format of the CAV type, although it is easy to control the revolution of the disk during a data-recording and a data-reproducing, there is an inconvenience that a density is low at an outer periphery of the disk, and thus a memory capacity cannot be made larger. Therefore, there also exists a recording format such as an MCAV (Modified CAV) type in which the face of an optical disk is divided into a predetermined number of tracks so as to form a plurality of zones, and data is recorded by making an angular velocity and a recording density constant in each zone, and also exists an MCLV (Modified CLV) type. These recording formats are also employed in an MO, etc.

However, many of optical disks used generally at present such as a CD family perform a data-recording with the format of the CLV type having the largest disk capacity. This method increases an error correction capability by interleaving record data; therefore, a continuity of an interleave and a data row needs to be maintained.

When a recording or a reproducing is performed to these optical disks on which data is recorded in the format of the CLV type, a CLV (Constant Linear Velocity) method is mainly used. For the sake of a high-speed data-recording, data is generally recorded at a linear velocity predetermined times as fast as a standard velocity.

In addition, Japanese Laid-Open Patent Application No. 10-49990 and Japanese Laid-Open Patent Application No. 2000-40302 disclose a technology as follows. In this technology, in order to overcome a buffer underrun error in which data is emptied from a buffer memory for a recording so as to disable the continuation of a recording, a pause and a restart of a recording that guarantee the continuity of an interleave and a data row are performed. Upon performing the pause and the restart, an interleave circuit is maintained in a state immediately after the pause of the recording, and when a preparation for the restart is completed, the interleave circuit is caused to operate from a position immediately after the pause so as to record a data row without a discontinuity on the optical disk.

However, as shown in FIG. 2-(a), in the CLV method, since the revolutions of the disk are large in number at the inner periphery of the optical disk, there is an inconvenience that the revolutions of the disk cannot be increased due to a limit of a revolving system at the inner periphery of the optical disk; thus the recording velocity cannot be increased. Inconveniences of the revolving system include not only a limitation due to a mechanical requirement for a high torque, but also an increase in an amount of electric power to be consumed in a spindle motor and a motor driver thereof.

Thereupon, a data-recording by a CAV method has been attempted to be performed, in which an angular velocity of the disk is constant. Upon a data-reproducing, not only the CLV method, but also the CAV method is generally used, in which a transfer rate becomes higher toward the outer periphery of the optical disk. However, the data-recording by the CAV method is not used in general very much, because there are many problems as follows: a laser power required for a data-recording becomes larger as the data-recording proceeds toward the outer periphery of the optical disk, making the control thereof difficult; a recording signal frequency varies continuously within the optical disk, complicating the generation of a recording pulse; etc.

In addition, when a data-recording involves a sharp change of the velocity, a continuity of an interleave and a data row has to be maintained before and after the change. Since a certain amount of time is generally required to stabilize a revolving system of the optical disk, changing the recording velocity sharply during a data-recording may possibly deteriorate the quality of a signal at the recorded part and thus disable the reproduction thereof.

Further, conventionally, since a pause during a data-recording is not allowed to be performed, a data-writing unit becomes large to a certain extent. Therefore, when a transfer of record data from a host computer cannot keep up with the recording velocity, a recording error called buffer-underrun occurs.

Additionally, disk-type recording media with a constant linear velocity include a CD-R (Compact Disk Recordable) disk. Conventionally, this CD-R disk is revolved at a constant linear velocity (CLV) to record data thereon. In this case, a relative velocity between the disk-type recording medium and a laser beam is always constant; therefore, once recording conditions such as a recording power and a record pulse width are set optimally, these recording conditions do not need to be changed throughout the surface of the disk.

Therefore, normally, a test-writing is performed in a specific area at the innermost periphery of the disk, with changing the recording power variously, so as to determine an optimum recording power, with which power a recording can be performed at an equal linear velocity throughout the surface of the disk without causing any problem.

However, in the CLV method, as the recording is performed nearer the inner periphery, the revolution of the disk needs to be made faster, i.e., the angular velocity of the disk needs to be made higher, making it difficult to revolve the disk at such a high speed. This leads to a higher cost of a motor and the increase in noises and vibrations; it also becomes difficult to design other servo systems.

Thereupon, several measures have been taken, in which the angular velocity is not made very low at the outer periphery, while the angular velocity is not made so high at the inner periphery.

In this case, the linear velocity becomes higher nearer the outer periphery. In a case of a complete constant angular velocity (CAV), the linear velocity becomes higher in proportion with the radius of the disk.

In any of the above-mentioned measures, the angular velocity at the inner periphery is not made high; therefore, in some cases, a recording is performed at a velocity different from the velocity at the inner periphery in which a test-writing is performed.

In these cases, how to set or arrange the recording power and other recording conditions is a matter of concern.

Thereupon, conventionally, there has been an information recording device changing a recording power, when performing a recording at an undesired linear velocity, according to a clock frequency in proportion with the linear velocity (for example, see Japanese Laid-Open Patent Application No. 11-296858).

However, the above-mentioned conventional information recording devices cannot perform a high-quality recording unless recording characteristics (i.e., a necessary recording power and other recording conditions) of the disk-type recording medium are completely in proportion with the linear velocity. Essentially, there does not exist such a disk-type recording medium; rather, there are inevitable differences in recording characteristics among various types of disk-type recording mediums.

SUMMARY OF THE INVENTION

It is a general object of the present invention to provide an improved and useful optical disk device, an information processing device, an optical disk recording method, a constant estimating method, and an information recording device in which the above-mentioned problems are eliminated.

A more specific object of the present invention is to provide an optical disk device, an information processing device, an optical disk recording method, a constant estimating method, and an information recording device which can effectively shorten an average recording time by increasing an average recording velocity even in a data-recording requiring a continuity, can curb the amount of electric power consumed during a data-recording, can perform a stable data-reproduction after a data-recording for each zone on an optical disk by appropriately adjust a recording power, can achieve an stable quality of a data-recording by maintaining a continuity of an interleave and a data row even at a boundary between zones on an optical disk, can achieve a further stable quality of a data-recording by maintaining a continuity of an interleave and a data row at a boundary between zones on an optical disk more accurately, and can accurately determine a recording power and other recording conditions even at a linear velocity different from a linear velocity in a test-writing so as to perform a high-quality recording even at a high-speed area.

In order to achieve the above-mentioned objects, there is provided according to one aspect of the present invention an optical disk device recording data on a recordable or rewritable optical disk, the device comprising:

zone storing means for preliminarily storing locations of a plurality of zones set by dividing a recordable or rewritable area of the optical disk from an inner periphery thereof to an outer periphery thereof;

position detecting means for detecting a position on the optical disk so as to record data at the position;

judging means for judging which of the zones the position corresponds to by referring to the zone storing means; and controlling means for controlling the device to perform a data-recording by a CLV method to each of the zones specified by the judging means by setting a recording velocity and a recording power for each of the zones so as to enable the data-recording to provide an equal recording density to all of the zones.

According to the present invention, in the CLV method in which a recording velocity at the inner periphery of the optical disk has a limit due to such factors as a limit of a revolution control of the optical disk, the recording velocity can be changed at the inner periphery and the outer periphery so as to effectively shorten an average recording time even in recording data requiring a continuity, and to make a high-speed revolution of the optical disk unnecessary, curbing the amount of electric power consumed during a data-recording.

Additionally, the optical disk device according to the present invention may further comprise:

first recording power determining means for determining the recording power in a first zone of the zones by performing an OPC (Optimum Power Calibration) in a test-writing area on the optical disk at a recording velocity preliminary set for the first zone, the data-recording being first performed to the first zone; and second recording power determining means for determining the recording power in one of other zones of the zones by multiplying the recording power determined by the first recording power determining means by a predetermined constant.

According to the present invention, by preparing a constant beforehand in accordance with a recording power that changes depending on other conditions in designs of the optical disk device and the optical disk than a recording velocity, a stable data-reproduction after a data-recording for each zone on the optical disk can be performed.

Additionally, the optical disk device according to the present invention may further comprise:

pausing means for pausing the data-recording when the data-recording is performed to an end of one of the zones;

stabilizing means for stabilizing a revolving system of the optical disk so as to perform the data-recording to a next zone of the zones at the recording velocity corresponding to the next zone when the pausing is performed, the data-recording being next performed to the next zone; and restarting means for restarting the data-recording from a start of the next zone after the stabilizing is finished.

According to the present invention, upon recording continuous data on a boundary part between the zones on the optical disk, the data-recording can be temporarily stopped, and after the change in the revolving velocity of the optical disk is completed, the data-recording can be restarted at a recording velocity in the next zone so that a continuity of an interleave and a data row can be maintained even at the boundary part, achieving a stable quality of a data-recording.

Additionally, the optical disk device according to the present invention may further comprise timing means for timing the restarting by counting a frame sync clock obtained by reading the data recorded on the optical disk immediately before the pausing.

According to the present invention, a continuity of an interleave and a data row can be maintained more accurately at the boundary part, achieving a further stable quality of a data-recording.

Additionally, in the optical disk device according to the present invention, the data-recording may be performed by one of a TAO (Track at once) recording mode and an SAO (Session at once) recording mode, and the zone storing means may store a boundary between tracks on the optical disk as a boundary between the zones in the TAO recording mode, and store a boundary between sessions on the optical disk as the boundary between the zones in the SAO recording mode.

According to the present invention, even without the above-mentioned means for accurately maintaining a continuity of an interleave and a data row at the boundary part, a boundary between tracks or sessions can be recognized as a boundary between the zones so that a continuity of an interleave and a data row can be maintained even at the boundary part, achieving a stable quality of a data-recording.

Additionally, in the optical disk device according to the present invention, the data-recording may be performed by packet-writing, and the zone storing means may store a boundary between the zones in a link sector of a packet.

According to the present invention, even without the above-mentioned means for accurately maintaining a continuity of an interleave and a data row at the boundary part, a link sector of a packet can be recognized as a boundary between the zones so that a continuity of an interleave and a data row can be maintained even at the boundary part; thus a stable quality of a data-recording can be achieved, and a data-recording time can be shortened.

In order to achieve the above-mentioned objects, there is also provided according to another aspect of the present invention an optical disk device recording data on a recordable or rewritable optical disk, the device comprising:

first controlling means for controlling the device to perform a data-recording by a CAV method so as to provide a constant recording density;

detecting means for detecting an occurrence of a cause of a recording error;

pausing means for pausing the data-recording when the occurrence is detected; and second controlling means for controlling the device to restart the data-recording by a CLV method at a second recording velocity not exceeding a first recording velocity immediately before the pausing so as to provide a recording density equal to the constant recording density when the pausing is performed.

According to the present invention, even when a cause of such a recording error as a buffer underrun occurs as a data-recording by the CAV method proceeds to the outer periphery of the optical disk, the data-recording by the CAV method can be switched to the data-recording by the CLV method at a recording velocity equal to or less than a recording velocity just before a pause so as to increase the average recording velocity, without involving a frequent pause/restart as conventionally.

Additionally, the optical disk device according to the present invention may further comprise restarting means for restarting the data-recording by the CAV method upon a fulfillment of a predetermined condition when the pausing is performed, wherein the second controlling means may control the device to restart the data-recording by the CLV method for the first time when the pausing is performed predetermined times.

According to the present invention, after a pause and a restart in the CAV method occurs predetermined times due to a cause of such a recording error as a buffer underrun, the data-recording by the CAV method is, for the first time, switched to the data-recording by the CLV method at a recording velocity equal to or less than a recording velocity just before the last pause so as to increase the average recording velocity.

Additionally, the optical disk device according to the present invention may further comprise timing means for timing the restarting by counting a frame sync clock obtained by reading the data recorded on the optical disk immediately before the pausing.

According to the present invention, a continuity of an interleave and a data row can be accurately maintained at a boundary between a recording by the CAV method and a recording by the CLV method; thus a stable quality of a data-recording can be achieved.

Additionally, the optical disk device according to the present invention may further comprise:

first recording power determining means for determining a recording power in a first zone by using a test-writing area on the optical disk at an initial recording velocity in performing the data-recording by the CAV method, the data-recording being first performed to the first zone; and second recording power determining means for determining a recording power used in performing the data-recording by the CLV method by multiplying the recording power determined by the first recording power determining means by a constant predetermined according to the second recording velocity in performing the data-recording by the CLV method.

According to the present invention, by preparing a constant beforehand in accordance with a recording power that changes depending on other conditions in designs of the optical disk device and the optical disk than a recording velocity, each of data recorded by the CAV method and data recorded by the CLV method can be stably reproduced after the data-recording.

In order to achieve the above-mentioned objects, there is also provided according to another aspect of the present invention an information processing device comprising:

an optical disk device recording data on a recordable or rewritable optical disk, the device including:

zone storing means for preliminarily storing locations of a plurality of zones set by dividing a recordable or rewritable area of the optical disk from an inner periphery thereof to an outer periphery thereof;

position detecting means for detecting a position on the optical disk so as to record data at the position;

judging means for judging which of the zones the position corresponds to by referring to the zone storing means; and controlling means for controlling the device to perform a data-recording by a CLV method to each of the zones specified by the judging means by setting a recording velocity and a recording power for each of the zones so as to enable the data-recording to provide an equal recording density to all of the zones.

According to the present invention, in the CLV method in which a recording velocity at the inner periphery of the optical disk has a limit due to such factors as a limit of a revolution control of the optical disk, the recording velocity can be changed at the inner periphery and the outer periphery so as to effectively shorten an average recording time even in recording data requiring a continuity, and to make a high-speed revolution of the optical disk unnecessary, curbing the amount of electric power consumed during a data-recording.

In order to achieve the above-mentioned objects, there is also provided according to another aspect of the present invention an information processing device comprising:

an optical disk device recording data on a recordable or rewritable optical disk, the device including:

first controlling means for controlling the device to perform a data-recording by a CAV method so as to provide a constant recording density;

detecting means for detecting an occurrence of a cause of a recording error;

pausing means for pausing the data-recording when the occurrence is detected; and second controlling means for controlling the device to restart the data-recording by a CLV method at a second recording velocity not exceeding a first recording velocity immediately before the pausing so as to provide a recording density equal to the constant recording density when the pausing is performed.

According to the present invention, even when a cause of such a recording error as a buffer underrun occurs as a data-recording by the CAV method proceeds to the outer periphery of the optical disk, the data-recording by the CAV method can be switched to the data-recording by the CLV method at a recording velocity equal to or less than a recording velocity just before a pause so as to increase the average recording velocity, without involving a frequent pause/restart as conventionally.

In order to achieve the above-mentioned objects, there is also provided according to another aspect of the present invention an optical disk recording method for recording data on a recordable or rewritable optical disk, the method comprising:

the position detecting step of detecting a position on the optical disk so as to record data at the position;

the judging step of judging which of a plurality of zones the position corresponds to by referring to location information stored preliminarily regarding the zones, the plurality of the zones being set by dividing a recordable or rewritable area of the optical disk from an inner periphery thereof to an outer periphery thereof; and the recording step of performing a data-recording by a CLV method to each of the zones specified by the judging step by setting a recording velocity and a recording power for each of the zones so as to enable the data-recording to provide an equal recording density to all of the zones.

According to the present invention, in the CLV method in which a recording velocity at the inner periphery of the optical disk has a limit due to such factors as a limit of a revolution control of the optical disk, the recording velocity can be changed at the inner periphery and the outer periphery so as to effectively shorten an average recording time even in recording data requiring a continuity, and to make a high-speed revolution of the optical disk unnecessary, curbing the amount of electric power consumed during a data-recording.

Additionally, the optical disk recording method according to the present invention may further comprise:

the first recording power determining step of determining the recording power in a first zone of the zones by performing an OPC in a test-writing area on the optical disk at a recording velocity preliminary set for the first zone, the data-recording being first performed to the first zone; and the second recording power determining step for determining the recording power in one of other zones of the zones by multiplying the recording power determined by the first recording power determining step by a predetermined constant.

According to the present invention, by preparing a constant beforehand in accordance with a recording power that changes depending on other conditions in designs of the optical disk device and the optical disk than a recording velocity, a stable data-reproduction after a data-recording for each zone on the optical disk can be performed.

Additionally, the optical disk recording method according to the present invention may further comprise:

the pausing step of pausing the data-recording when the data-recording is performed to an end of one of the zones;

the stabilizing step of stabilizing a revolving system of the optical disk so as to perform the data-recording to a next zone of the zones at the recording velocity corresponding to the next zone when the pausing step is performed, the data-recording being next performed to the next zone; and the restarting step of restarting the data-recording from a start of the next zone after the stabilizing step is finished.

According to the present invention, upon recording continuous data on a boundary part between the zones on the optical disk, the data-recording can be temporarily stopped, and after the change in the revolving velocity of the optical disk is completed, the data-recording can be restarted at a recording velocity in the next zone so that a continuity of an interleave and a data row can be maintained even at the boundary part, achieving a stable quality of a data-recording.

Additionally, in the optical disk recording method according to the present invention, the restarting step may control a timing of the restarting by counting a frame sync clock obtained by reading the data recorded on the optical disk immediately before the pausing.

According to the present invention, a continuity of an interleave and a data row can be maintained more accurately at the boundary part, achieving a further stable quality of a data-recording.

Additionally, in the optical disk recording method according to the present invention, the data-recording may be performed by one of a TAO (Track at once) recording mode and an SAO (Session at once) recording mode, and the judging step may judge which of the zones the position corresponds to by referring to location information stored preliminarily regarding the zones, the location information including a boundary between tracks on the optical disk as a boundary between the zones in the TAO recording mode, and a boundary between sessions on the optical disk as the boundary between the zones in the SAO recording mode.

According to the present invention, even without the above-mentioned steps for accurately maintaining a continuity of an interleave and a data row at the boundary part, a boundary between tracks or sessions can be recognized as a boundary between the zones so that a continuity of an interleave and a data row can be maintained even at the boundary part, achieving a stable quality of a data-recording.

Additionally, in the optical disk recording method according to the present invention, the data-recording may be performed by packet-writing, and the judging step may judge which of the zones the position corresponds to by referring to location information stored preliminarily regarding the zones, the location information being stored in a link sector of a packet as a boundary between the zones.

According to the present invention, even without the above-mentioned steps for accurately maintaining a continuity of an interleave and a data row at the boundary part, a link sector of a packet can be recognized as a boundary between the zones so that a continuity of an interleave and a data row can be maintained even at the boundary part; thus a stable quality of a data-recording can be achieved, and a data-recording time can be shortened.

In order to achieve the above-mentioned objects, there is also provided according to another aspect of the present invention an optical disk recording method for recording data on a recordable or rewritable optical disk, the method comprising:

the first recording step of performing a data-recording by a CAV method so as to provide a constant recording density;

the detecting step of detecting an occurrence of a cause of a recording error;

the pausing step of pausing the data-recording when the occurrence is detected; and the second recording step of restarting the data-recording by a CLV method at a second recording velocity not exceeding a first recording velocity immediately before the pausing so as to provide a recording density equal to the constant recording density when the pausing step is performed.

According to the present invention, even when a cause of such a recording error as a buffer underrun occurs as a data-recording by the CAV method proceeds to the outer periphery of the optical disk, the data-recording by the CAV method can be switched to the data-recording by the CLV method at a recording velocity equal to or less than a recording velocity just before a pause so as to increase the average recording velocity, without involving a frequent pause/restart as conventionally.

Additionally, the optical disk recording method according to the present invention may further comprise the restarting step of restarting the data-recording by the CAV method upon a fulfillment of a predetermined condition when the pausing step is performed, wherein the second recording step may restart the data-recording by the CLV method for the first time when the pausing step is performed predetermined times.

According to the present invention, after a pause and a restart in the CAV method occurs predetermined times due to a cause of such a recording error as a buffer underrun, the data-recording by the CAV method is, for the first time, switched to the data-recording by the CLV method at a recording velocity equal to or less than a recording velocity just before the last pause so as to increase the average recording velocity.

Additionally, in the optical disk recording method according to the present invention, the second recording step may control a timing of the restarting by counting a frame sync clock obtained by reading the data recorded on the optical disk immediately before the pausing.

According to the present invention, a continuity of an interleave and a data row can be accurately maintained at a boundary between a recording by the CAV method and a recording by the CLV method; thus a stable quality of a data-recording can be achieved.

Additionally, the optical disk recording method according to the present invention may further comprise:

the first recording power determining step of determining a recording power in a first zone by using a test-writing area on the optical disk at an initial recording velocity in performing the data-recording by the CAV method, the data-recording being first performed to the first zone; and the second recording power determining step of determining a recording power used in performing the data-recording by the CLV method by multiplying the recording power determined by the first recording power determining step by a constant predetermined according to the second recording velocity in performing the data-recording by the CLV method.

According to the present invention, by preparing a constant beforehand in accordance with a recording power that changes depending on other conditions in designs of the optical disk device and the optical disk than a recording velocity, each of data recorded by the CAV method and data recorded by the CLV method can be stably reproduced after the data-recording.

In order to achieve the above-mentioned objects, there is also provided according to another aspect of the present invention a constant estimating method for estimating a constant used in an optical disk recording method for recording data on a recordable or rewritable optical disk, the optical disk recording method comprising:

the position detecting step of detecting a position on the optical disk so as to record data at the position;

the judging step of judging which of a plurality of zones the position corresponds to by referring to location information stored preliminarily regarding the zones, the plurality of the zones being set by dividing a recordable or rewritable area of the optical disk from an inner periphery thereof to an outer periphery thereof;

the first recording power determining step of determining a first recording power in a first zone of the zones at the innermost periphery of the optical disk by performing an OPC in a test-writing area on the optical disk at a first recording velocity preliminary set for the first zone, a data-recording being first performed to the first zone;

the second recording power determining step for determining a second recording power in one of other zones of the zones by multiplying the first recording power by the constant, the data-recording being performed to the one of the other zones at a second recording velocity; and the recording step of performing the data-recording by a CLV method to each of the zones specified by the judging step by using one of the first recording velocity and the second recording velocity corresponding to each of the zones and one of the first recording power and the second recording power corresponding to each of the zones so as to enable the data-recording to provide an equal recording density to all of the zones, the constant estimating method comprising:

the OPC step of performing an OPC at the first recording velocity so as to calculate the first recording power in the first zone; and the estimating step of estimating the constant by repeatedly performing a data-recording at a recording velocity obtained by being variously multiplied by a proper constant close to a value induced from a relationship that, when a recording velocity is doubled, a necessary recording power becomes $\sqrt{2}$ times as large, and examining a recording state on the optical disk after the data-recording.

According to the present invention, a constant can be obtained beforehand in accordance with a recording power that changes depending on other conditions in designs of the optical disk device and the optical disk than a recording velocity; thus the second recording power to be used in the other zones can be calculated by multiplying the first recording power used in the first zone by the constant.

In order to achieve the above-mentioned objects, there is also provided according to another aspect of the present invention an information recording device writing information in a circumferential direction of a disk-type recording medium with a substantially constant linear density, the device comprising:

test-writing means for performing a test-writing in a predetermined area on the disk-type recording medium at a predetermined basic linear velocity so as to determine an optimum recording power at the basic linear velocity according to a result of the test-writing; and recording-power setting means for setting a recording power according to a result of a predetermined calculation performed to the optimum recording power, when a recording is performed on the disk-type recording medium at a linear velocity different from the predetermined basic linear velocity.

The information recording device according to the present invention can accurately determine the recording power even at a linear velocity different from a linear velocity in a test-writing so as to perform a high-quality recording even at a high-speed area.

Additionally, in the information recording device according to the present invention, the test-writing means includes optimum recording-state storing means for storing a value in accordance with a reproduction signal reproduced from the disk-type recording medium as an optimum recording-state targeted value, when a recording is performed on the disk-type recording medium with the optimum recording power; and the recording-power setting means includes:

recording-state targeted value setting means for setting a recording-state targeted value according to a result of a predetermined calculation performed to the optimum recording-state targeted value, when the recording is performed on the disk-type recording medium at the linear velocity different from the predetermined basic linear velocity; and power correcting means for correcting the recording power by comparing the recording-state targeted value with the value during a recording of information to the disk-type recording medium.

The information recording device according to the present invention can accurately correct the recording power even at a linear velocity different from a linear velocity in a test-writing so as to perform a higher-quality recording even at a high-speed area.

Additionally, the information recording device according to the present invention may include operational expression/coefficient setting means for setting at least one of an operational expression and a coefficient performing the predetermined calculation, in accordance with a type of the disk-type recording medium.

The information recording device according to the present invention can appropriately set and correct the recording power for various disk-type recording mediums so as to perform a higher-quality recording even at a high-speed area.

Additionally, the information recording device according to the present invention may include medium-type judging means for judging the type of the disk-type recording medium according to an identification code embedded in the disk-type recording medium.

The information recording device according to the present invention can appropriately set and correct the recording power for various disk-type recording mediums of various makers so as to perform a higher-quality recording even at a high-speed area.

Additionally, the information recording device according to the present invention may include record-pulse-width changing means for changing a record pulse width according to the linear velocity.

The information recording device according to the present invention can accurately set a record pulse width even at a linear velocity different from a linear velocity in a test-writing so as to perform a higher-quality recording even at a high-speed area.

Additionally, the information recording device according to the present invention may include record-pulse-width changing means for changing a record pulse width according to at least one of the linear velocity and the type of the disk-type recording medium.

The information recording device according to the present invention can more appropriately set a record pulse width for various mediums of various makers so as to perform a higher-quality recording even at a high-speed area.

Other objects, features and advantages of the present invention will become more apparent from the following detailed description when read in conjunction with the accompanying drawings.

BRIEF DESCRIPTION OF THE DRAWINGS

FIG. 24 is a table showing examples of a manufacturer ID code, a type code and a recording parameter number.

DETAILED DESCRIPTION OF THE PREFERRED EMBODIMENTS

[Embodiment 1]

A description will now be given of a first embodiment according to the present invention.

Figure 1:
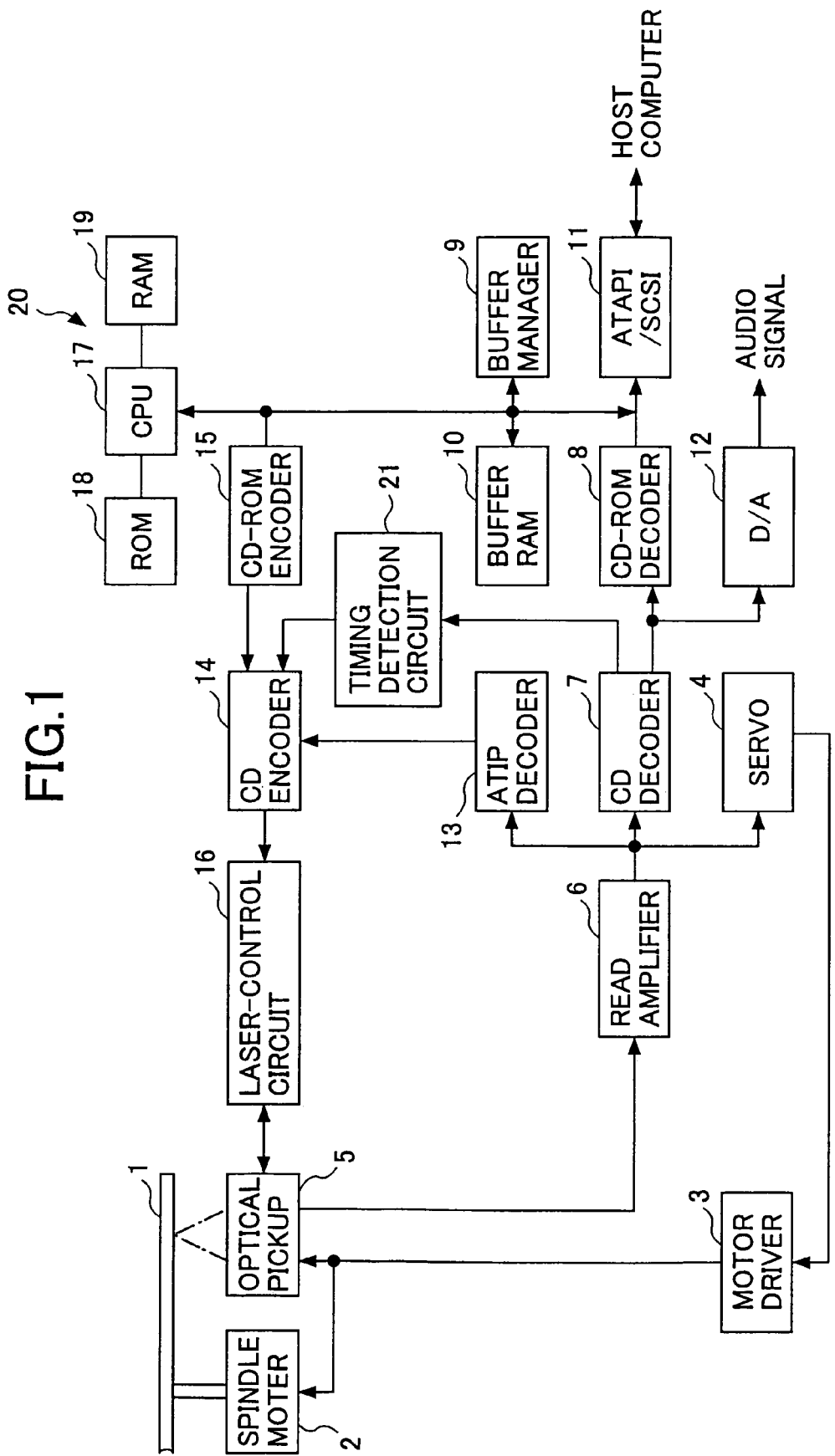
FIG. 1 is a block diagram showing an electrical connection of an optical disk device according to a first embodiment of the present invention.

FIG. 1 is a block diagram showing a structure of an optical disk device according to a first embodiment of the present invention. This optical disk device can record data to a CD-R/RW (CD-Recordable/Rewritable).

As shown in FIG. 1, an optical disk 1 is revolved by a spindle motor 2. The spindle motor 2 is controlled by a motor driver 3 and a servo means 4 so that the spindle motor 2 revolves the optical disk 1 by a CLV (Constant Linear Velocity) method.

Next, an optical pickup 5 can project a laser beam from a laser beam source such as a laser diode and can converge the laser beam on a recording surface of the optical disk 1 by an objective lens. The optical pickup 5 can reproduce data from and record data to the optical disk 1 by controlling an actuator by using a focus servo and a track servo.

In reproducing data, a reproduction signal obtained by the optical pickup 5 is amplified by a read amplifier 6 so as to be made binary, and thereafter, is supplied to a CD decoder 7 to be subjected to processes of a de-interleave and an error correction. Further, the data after the processes is supplied to a CD-ROM decoder 8 to be subjected to an error correction process so as to enhance the reliability of the data.

Thereafter, the data processed in the CD-ROM decoder 8 is temporarily accumulated in a buffer RAM 10 by a buffer manager 9, and when the data is accumulated enough to be sector data, the data is transferred to a host computer at one time by a host interface 11. In a case of music data, the data from the CD decoder 7 is supplied to a D/A converter 12 so as to take out analog audio signal.

On the other hand, in recording data, data transferred from a host computer via the host interface 13 of ATAPI or SCSI is temporarily accumulated in the buffer RAM 10, and thereafter a recording is started. Before the start of the data recording, an OPC (Optimum Power Calibration) is performed in a test-writing area called a PCA area (a Power Calibration Area) so as to obtain an optimum recording power.

When recording data to the optical disk 1, the data is recorded in the CLV method in which a recording linear velocity is constant. The recording linear velocity can be changed step by step (described later in this description). A standard linear velocity (a single-fold velocity) is 1.2 to 1.4 mm/sec, and data is recorded with an EFM (Eight to Fourteen Modulation) pulse signal of a 3T to 11T width (1T=231 ns) being as a data pattern to be written to the optical disk 1. The EFM signal is 14-bit data modulated from 8-bit data that is interleaved so as to make it easy to reproduce or record optically. In practice, for the purpose of a high-speed recording, a recording is performed at a linear velocity (for example, 1×, 2×, 4×, 8×, 12×, etc.) obtained by multiplying this standard linear velocity by an integer. As many optical disk devices have a plurality of recording velocity modes, this optical disk device also has recording velocity modes of 12×, 16× and 20×, and is capable of changing the recording velocity modes during a data-recording (described later in this description).

A data-recording starts when a certain amount of data is accumulated in the buffer RAM 10. Prior to this, a laser spot is positioned at a starting position of a data-writing. The starting position is obtained by an ATIP (Absolute Time In Pre-groove) signal that is a wobble signal engraved beforehand in the optical disk 1 by a wobbling track (pre-groove). The ATIP signal is time information indicating an absolute address on an optical disk. An ATIP decoder 13 extracts information of the ATIP signal, and also detects an ATIP error so as to calculate a detected error rate of the ATIP signal.

A synchronizing signal generated by the ATIP decoder 13 is supplied to a CD encoder 14 so as to enable a data-writing to start at an accurate position. The data in the buffer RAM 10 is subjected to processes of adding an error correction code and interleaving in a CD-ROM encoder 15 and the CD encoder 14, and then is recorded to the optical disk 1 via a laser-control circuit 16 and the optical pickup 5.

The optical disk device described above comprises a microcomputer 20 consisting of a CPU 17, a ROM 18 and a RAM 19 so as to perform a centralized control of operations of the above-mentioned parts.

Figure 2:
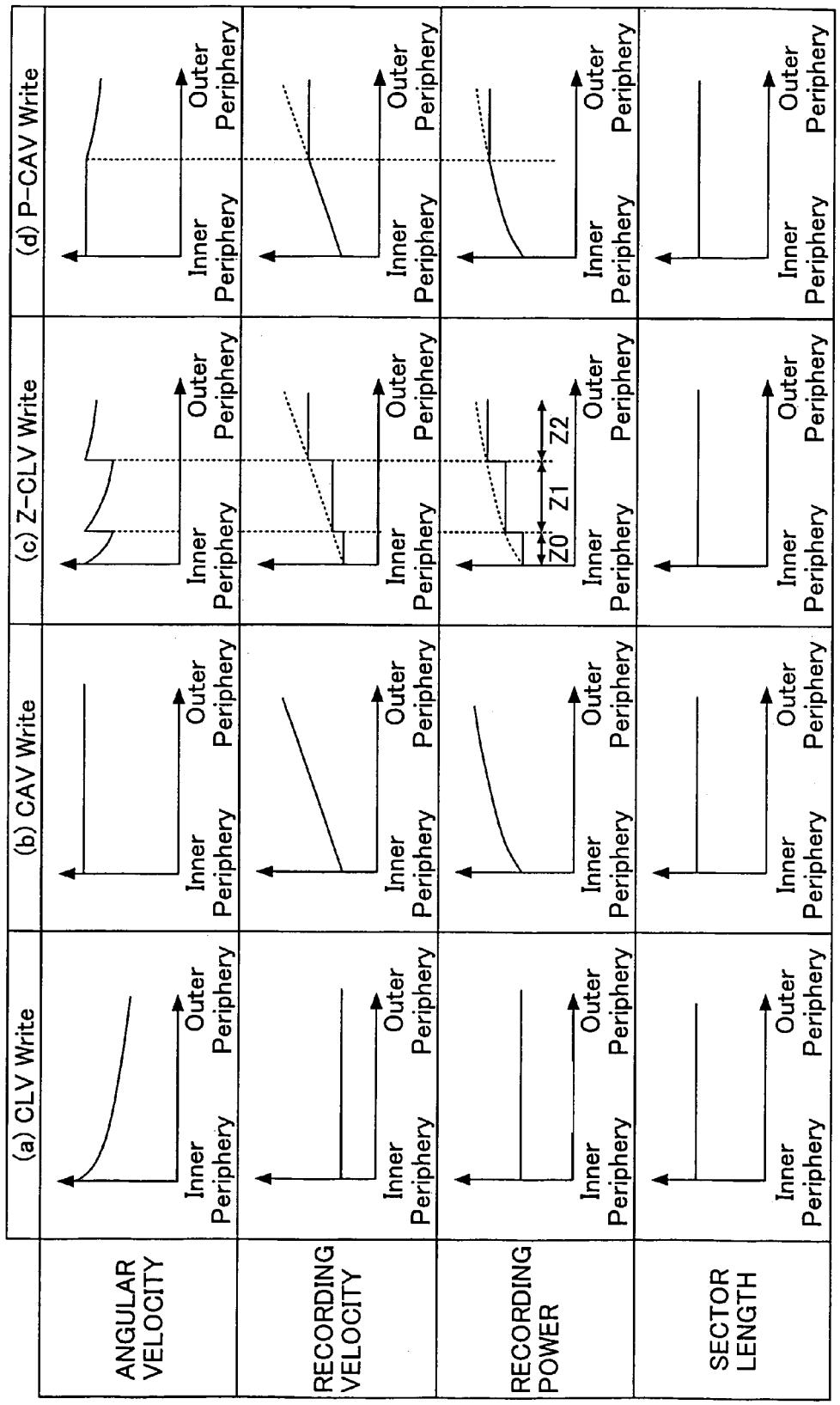
FIG. 2 is an explanatory illustration comparing formats of optical disks according to four data-recording methods.

FIG. 2 is an explanatory illustration comparing data-recording methods for a CD. FIG. 2-(a) to FIG. 2-(d) show changes of the revolutions (angular velocity) of a disk, a recording velocity, a recording power, and a sector length in a range from an inner periphery to an outer periphery of an optical disk for each method. It is noted that, in a case of CD, because a recording format is of the CLV method, each method has an equal sector length of the recorded optical disk.

In a data-recording (writing) of the conventional CLV method shown in FIG. 2-(a), since the revolutions of the disk are large in number at the inner periphery of the optical disk, the revolutions of the disk cannot be increased due to a limit of a revolution control system at the inner periphery of the optical disk; thus the recording velocity cannot be increased. This is not only due to a mechanical restriction requiring a high torque, but also due to such an increased amount of electric power to be consumed in circuits (a spindle motor and a motor driver thereof) of a revolution system as to exceed a tolerable electric power. Especially, in a note-type PC, the restriction on consumed electric power is so strict as to cause a problem for an optical disk device for a note-type PC.

Thereupon, in the optical disk device according to the present embodiment, a zone CLV (Z-CLV) recording is performed in which a plurality of recording zones are allocated in a face of the optical disk 1, and a recording speed is switched for each zone, as shown in FIG. 2-(c).

Thereby, the revolutions of the disk can be kept smaller in number at the inner periphery of the optical disk 1, and a high-speed data-recording at the outer periphery can provide an average recording velocity nearly equal to that of a data-recording of a CAV (Constant Angular Velocity) method.

Figure 3:
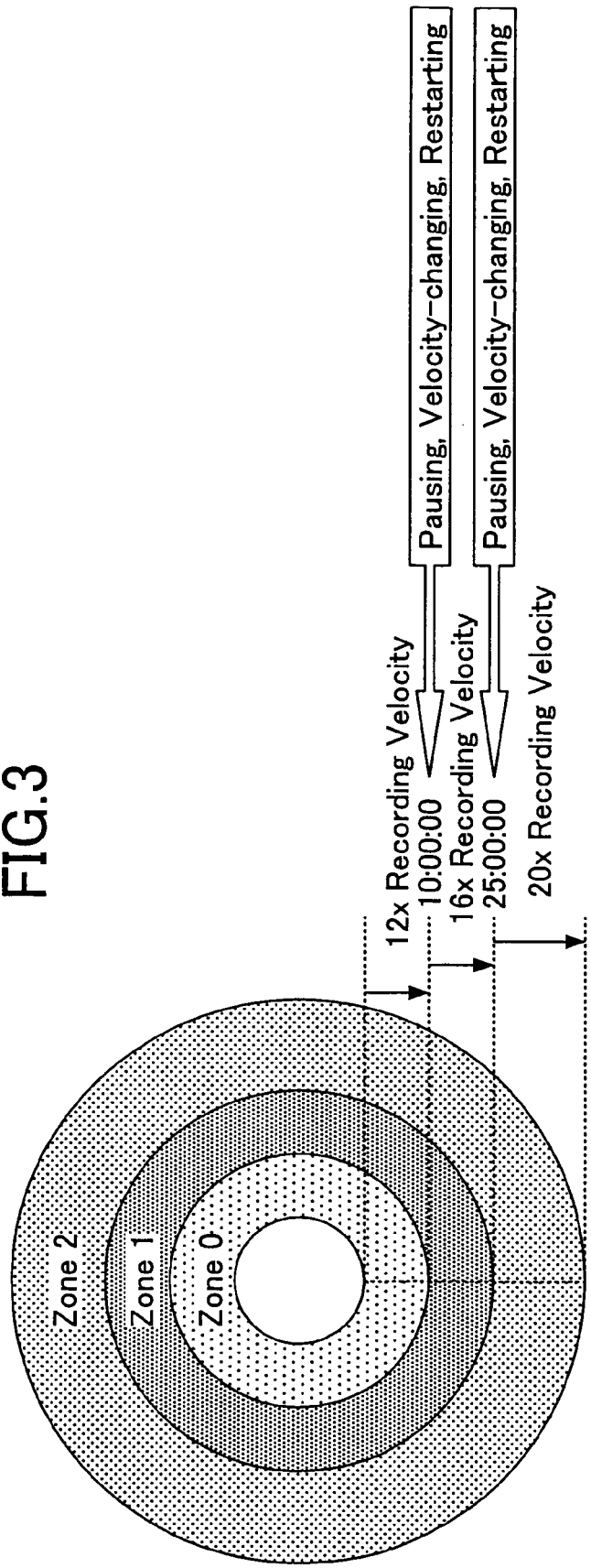
FIG. 3 is a plan view illustrating a format of an optical disk according to the first embodiment of the present invention.

Specifically, in this example, as shown in FIG. 2-(c) and FIG. 3, the optical disk 1 is divided into three zones of Z0, Z1 and Z2 (Zone 0, Zone 1 and Zone 2 in FIG. 3) from the innermost periphery to the outermost periphery thereof. Recording velocities of the zones Z0, Z1 and Z2 are set as 12×, 16×, and 20×, respectively. It is noted that the width, number and recording velocity of each zone are not limited to these disclosed here (provided that the number of zones is equal to or larger than 2), but can be set in variation. As the number of zones becomes larger, the difference in the average recording velocity from a complete CAV method can be made smaller.

A problem in performing the zone CLV (Z-CLV) is that a continuity of an interleave and a data row has to be maintained at a boundary between the zones at which the recording speed changes.

Since a certain amount of time is generally required to stabilize a driving system revolving the optical disk, changing the recording speed sharply during a data-recording may possibly deteriorate the quality of the data-recording and disable a data-reproducing. Therefore, it is required that, at each boundary between the zones, the recording is temporarily stopped, and after a velocity setting corresponding to a new zone is performed, the data-recording is restarted.

At this point, by performing a pause and a restart of a recording by the following method that guarantees the continuity of the interleave and the data row, the data row can be recorded without a discontinuity even at the boundaries.

Figure 4:
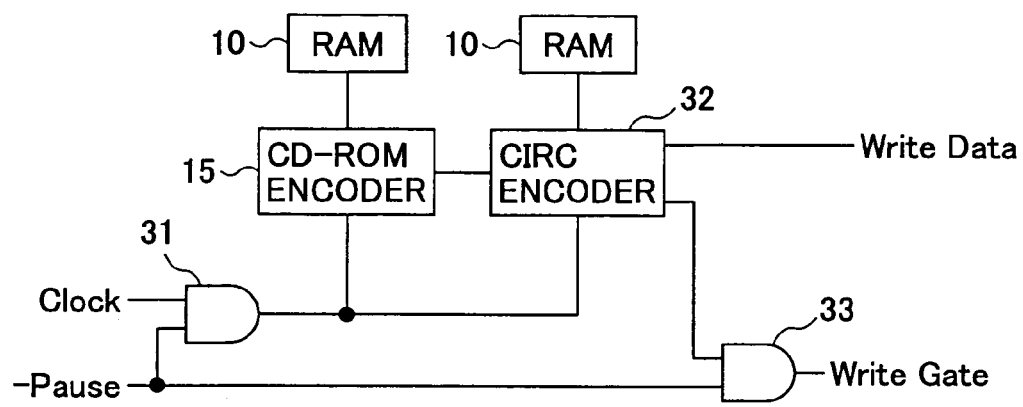
FIG. 4 is a block diagram showing an example of a circuit that realizes pause and restart functions of the optical disk device according to the first embodiment.

FIG. 4 is a block diagram showing an example of a circuit that realizes functions of such a pause and a restart. That is, because a host computer transfers continuous data without exception, it is easy to separate a data-writing unit physically when the CD-ROM encoder 15 and the CD encoder 14 have a pause function. In a circuit shown in FIG. 4, when a -Pause signal is supplied to an AND circuit 31, a supply of a clock signal to the CD-ROM encoder 15 and a CIRC (Cross Interleave Read-Solomon Code) encoder 32 (in the CD encoder 14) is interrupted. Thereby, the CD-ROM encoder 15 and the CIRC encoder 32 stop encoding operations and also cease outputting record data (write data). In addition, a gate signal (Write Gate) supplied from the CIRC encoder 32 which enables a data-recording by being active is masked also by the -Pause signal in an AND circuit 33; therefore, a data-recording to the optical disk 1 per se is stopped. However, since data being encoded remains in the buffer RAM 10, when the -Pause signal is cancelled, record data is continuously output, and upon canceling the mask of the Write Gate, the data-writing to the optical disk 1 is resumed. It should be noted that the -Pause signal needs to be highly synchronized for the pause and the restart of a data-writing, and a timing of supplying the -Pause signal (commencing the pause operation) is performed for each sector.

Here, a description will be given of a data formation unit of a CD. Specifically, data consists of 75 sectors per second, 98 EFM frames (hereinafter simply referred to as frame) per sector, and 588 channel bits (588T) per frame, and synchronizing signals are referred to as a sub-code sync (sector sync) clock and a frame sync clock, respectively. Absolute time information on the optical disk 1 obtained from the ATIP is expressed in sectors. When performing a normal data-recording without a pause, data is recorded by matching a time of the ATIP and a time of the CD encoder 14, i.e., synchronizing the ATIP signal and the sub-code sync clock of the record data. In this case, a displacement of several frames is tolerable. However, when performing a pause and a restart as mentioned above, such a higher precision as to the degree of several channel bits is required for a resuming position of a recording.

Figure 5:
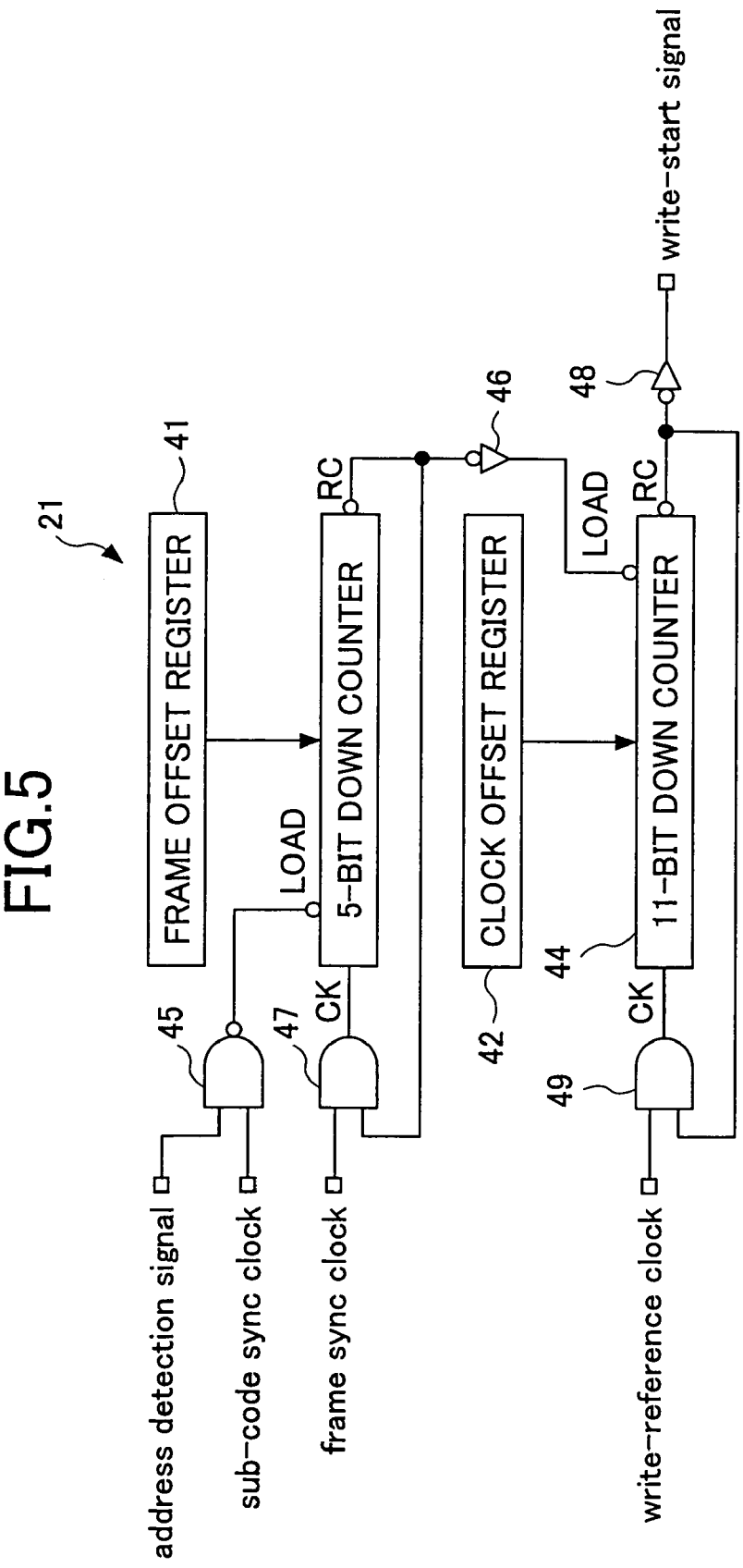
FIG. 5 is a block diagram of a timing detection circuit of the optical disk device according to the first embodiment.
Figure 6:
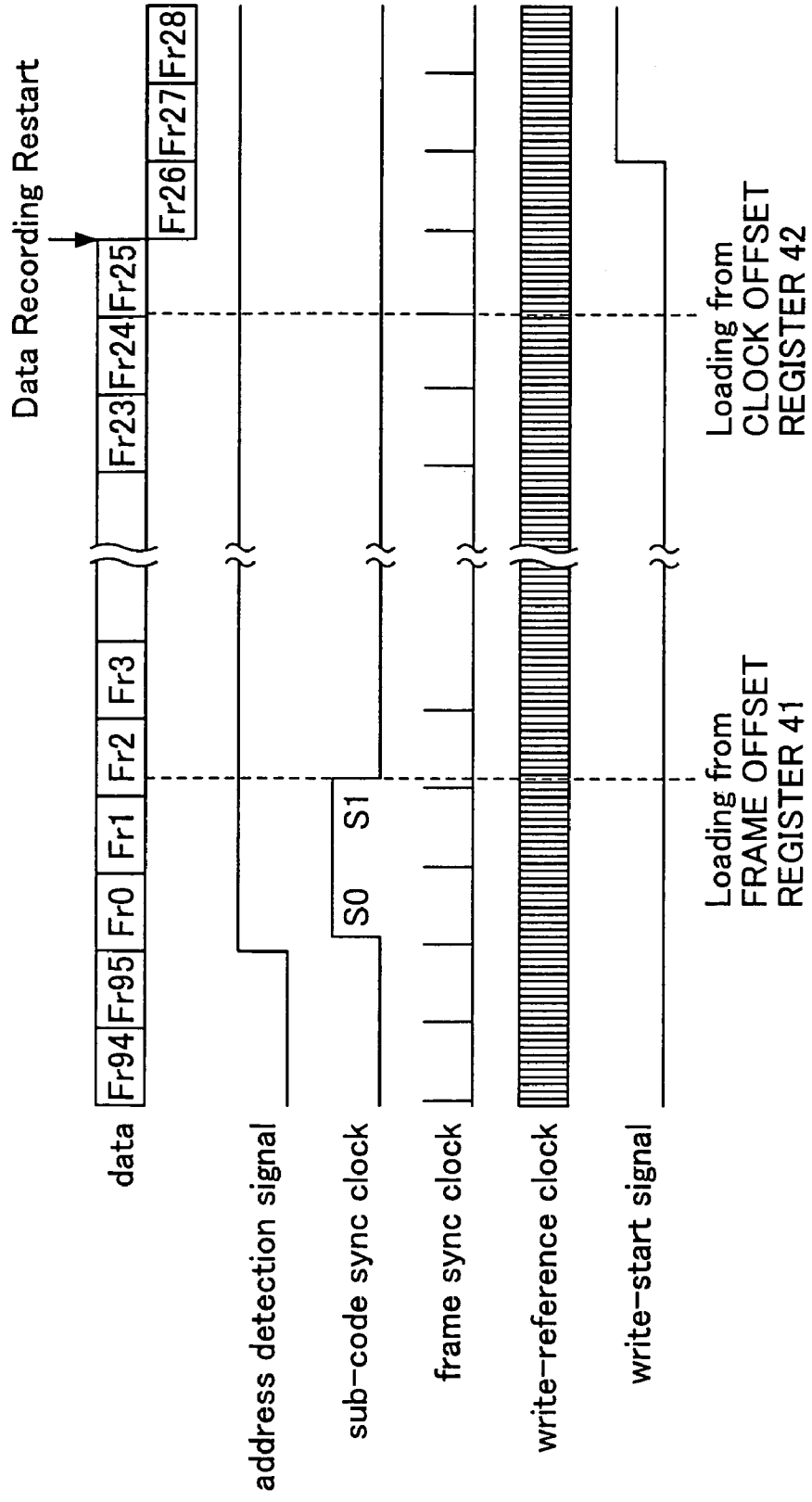
FIG. 6 is a timing chart explaining operations of the timing detection circuit shown in FIG. 5.

In order to determine the precise resuming (data-writing) position, a timing detection circuit 21 shown in FIG. 5 accurately adjusts an end of data written last time. This is a circuit that counts the frame sync clock so as to generate a timing signal that provides a start timing of a data-recording. FIG. 6 is a timing chart of each signal.

Specifically, the number of frame sync clocks from a sub-code sync clock to a frame sync clock of a frame Fr25 that is an end of a data-writing last time is registered in a frame offset register 41. The number of write-reference clocks (channel bits) from the frame sync clock of the frame Fr25 to a starting position of a data-recording is registered in a clock offset register 42.

In order to restart a data-recording, a seek operation is performed to an address at which the data-recording to the optical disk 1 is to be resumed. The seek operation is performed by address information of the ATIP or a sub-code Q-channel. When an address of a write-start sector 1 is detected, a load signal is supplied from an AND circuit 45 to the frame offset register 41, and a value in the frame offset register 41 is loaded into a 5-bit down counter 43 by the first sub-code sync clock. Then, the 5-bit down counter 43 is subjected to a decrement by the frame sync clock. When a value of the 5-bit down counter 43 becomes zero, the load signal is supplied to a 11-bit down counter 44 via an inverter 46, and a value of the clock offset register 42 is loaded into the 11-bit down counter 44. In addition, a supply of the frame sync clock to the 5-bit down counter 43 is stopped via an AND circuit 47. Then, the 11-bit down counter 44 is subjected to a decrement by the write-reference clock. When a value of the 11-bit down counter 44 becomes zero, a write-start signal is output via an inverter 48. In addition, a supply of the write-reference clock to the 11-bit down counter 44 is stopped via an AND circuit 49. This write-start signal cancels the -Pause signal. It is noted that the values loaded in the frame offset register 41 and the clock offset register 42 are examples, and these values are determined by design according to a delay time and a system from the sub-code sync clock to an input of the -Pause signal.

In other words, by counting the frame sync clock obtained by reading data recorded immediately before a pause on the optical disk 1, and further by performing a certain amount of delay by an encoder clock, a timing of the restart is controlled. Thereby, in the above-mentioned example, the data-recording is restarted at a frame Fr26. The operations of the timing detection circuit 21 realize a timing means and a restart step.

Figure 7:
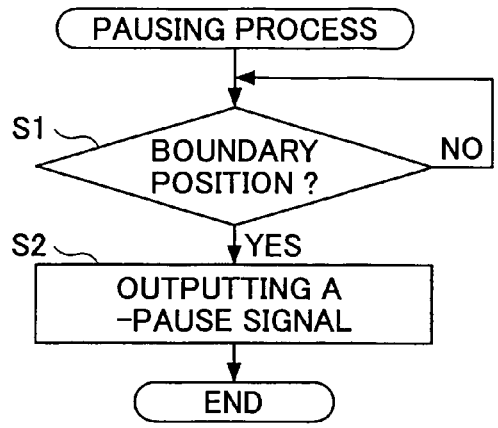
FIG. 7 is a flowchart explaining the pause function.
Figure 8:
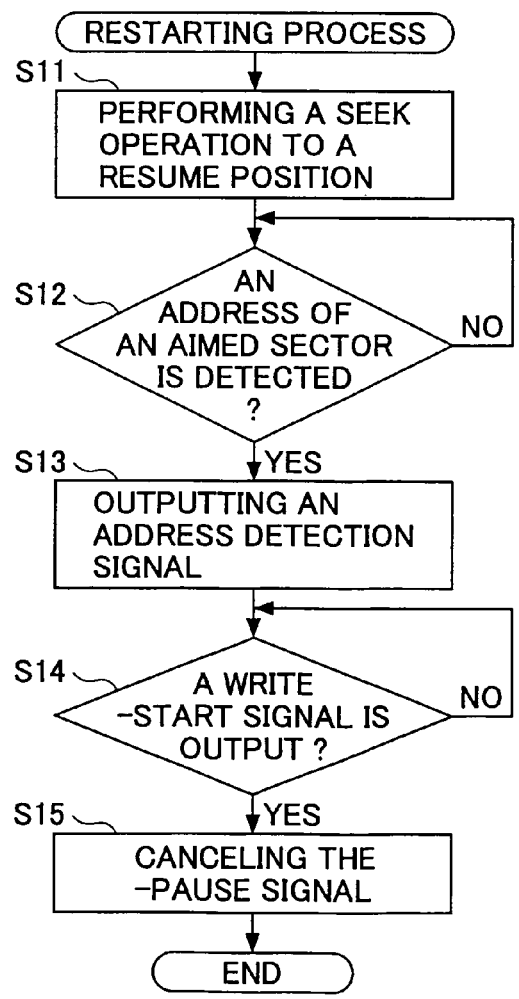
FIG. 8 is a flowchart explaining the restart function.

FIG. 7 and FIG. 8 are flowcharts showing a series of processes performed by the CPU 17 in the above-described pause and restart operations. As shown in FIG. 7, when a data-recording has been performed to a boundary of the present zone to the next zone (it can be judged from the ATIP signal, etc. whether or not the data-recording has been performed to the boundary, as described later in this description) (Y in step S1), the -Pause signal is output at the end of a sector being recorded so as to stop the encoding operations of the CD-ROM encoder 15 and the CIRC encoder 32, and also stop a data-recording to the optical disk 1 per se (step S2).

The restart operation is performed as shown in FIG. 8. Specifically, processes in FIG. 8 start when predetermined conditions for restarting are fulfilled. First, a seek operation is performed to an address at which the data-recording to the optical disk 1 is to be resumed (step S11). When the address of an aimed sector from which the data-recording is to be started is detected (Y in step S12), an address detection signal is output so as to supply the load signal to the frame offset register 41 so as to load a value (preliminarily registered) in the frame offset register 41 into the 5-bit down counter 43 (step S13). Thereafter, the timing detection circuit 21 performs the above-described operations. Then, when the write-start signal is output (Y in step S14), the -Pause signal is canceled so as to restart the data-recording (step S15).

By the way, as a recording velocity becomes larger, a larger recording power is required, in general. Therefore, when the recording velocity is changed before and after a boundary of adjacent zones, the recording power needs to be changed in accordance with a recording velocity at the next zone after the change. In this case, as shown in FIG. 2-(c), as the recording velocity becomes larger in zones toward the outer periphery of the optical disk 1, the recording power is set so as to become larger in zones toward the outer periphery of the optical disk 1.

Figure 9:
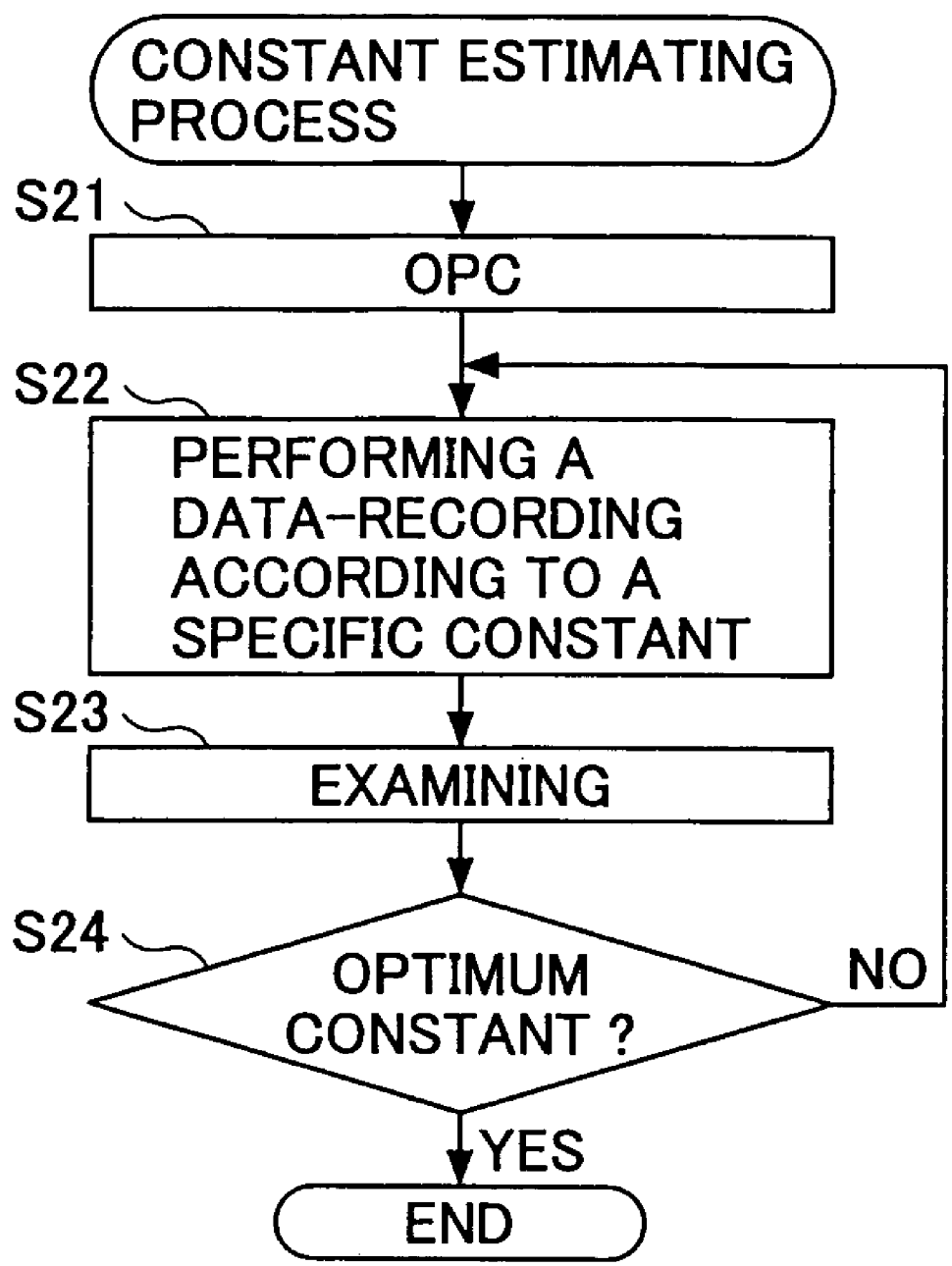
FIG. 9 is a flowchart explaining a constant estimating process obtaining a constant used in the optical disk device.

Recording powers in the zones Z0, Z1 and Z2 can be set in manufacturing processes as follows, for example. Specifically, as shown in a flowchart shown in FIG. 9, first, an OPC (Optimum Power Calibration) is performed at the recording velocity (12×) in the zone Z0 at the innermost periphery of the optical disk 1 so as to calculate the magnitude of the recording power in the zone Z0 (step S21). Thereby, an OPC step is realized.

Then, the recording powers in the zones Z1 and Z2 are calculated by multiplying the recording power in the zone Z0 by a certain constant. Namely, it is known that, when a recording velocity is doubled, a recording power required becomes approximately $\sqrt{2}$ (=1.41) times as large. However, in reality, a required recording power changes depending on a write strategy, i.e., other conditions in designs of the optical disk device and the optical disk 1 than the recording velocity, such as the optimization of the width of a recording EFM pulse and characteristics of the optical disk 1; therefore, an optimum recording power cannot be uniquely determined from the above-mentioned relationship. Thereupon, a data-recording is performed at a recording velocity obtained by being variously multiplied by a constant close to a value led from the relationship that, when a recording velocity is doubled, a recording power required becomes $\sqrt{2}$ times as large (step S22). Then, a recording state on the optical disk 1 after the recording is examined (step S23). These steps S22 and S23 are repeated (N in step S24) so as to estimate constants that make the magnitudes of the recording powers in the zones Z1 and Z2 optimum (Y in the step S24). Then the constants for the zones Z1 and Z2 are set in the ROM 18 of the optical disk device. The steps S22 to S24 realize an estimating step.

A further specific description will be given, with reference to Table 1 and FIG. 3. Manners to determine the range of each zone are considered to include a manner of determining from a time (or an address) on the optical disk 1 (for example, an absolute time on the optical disk 1 can be known by the ATIP signal) and a manner of determining from a radial position on the optical disk 1 (which can be known by detecting a revolution of a seek motor moving the optical pickup 5 to a radius of the optical disk 1). In this example, the range of each zone is determined from the time. Specifically, the range of the zone Z0 is from the innermost periphery of the optical disk 1 to a 10-minute position, and a recording velocity thereof is 12×. The zone Z1 ranges from the 10-minute position to a 25-minute position, and a recording velocity thereof is 16×. The zone Z2 ranges from the 25-minute position to the outermost periphery of the optical disk 1, and a recording velocity thereof is 20×. In this case, when the recording power in the zone Z0 obtained by performing the OPC at the recording velocity of 12× is assumed to be 25.0 mW, the recording power in the zone Z1 becomes 28.8 mw obtained by multiplying 25.0 mW by a constant of 1.15. The constant of 1.15 in this example is determined according to a square root of a ratio of the recording velocities, i.e., $\sqrt{(16/12)}$. The recording power in the zone Z2 becomes 32.3 mw obtained by multiplying 25.0 mW by a constant of 1.29.

TABLE 1

| ZONE | Speed | Pw | Pw estimating method |
|------|-------|------|----------------------|
| Z0 | 12x | 25.0 mW | OPC |
| Z1 | 16x | 28.8 mW | 25*1.15 |
| Z2 | 20x | 32.3 mW | 25*1.29 |

Figure 10:
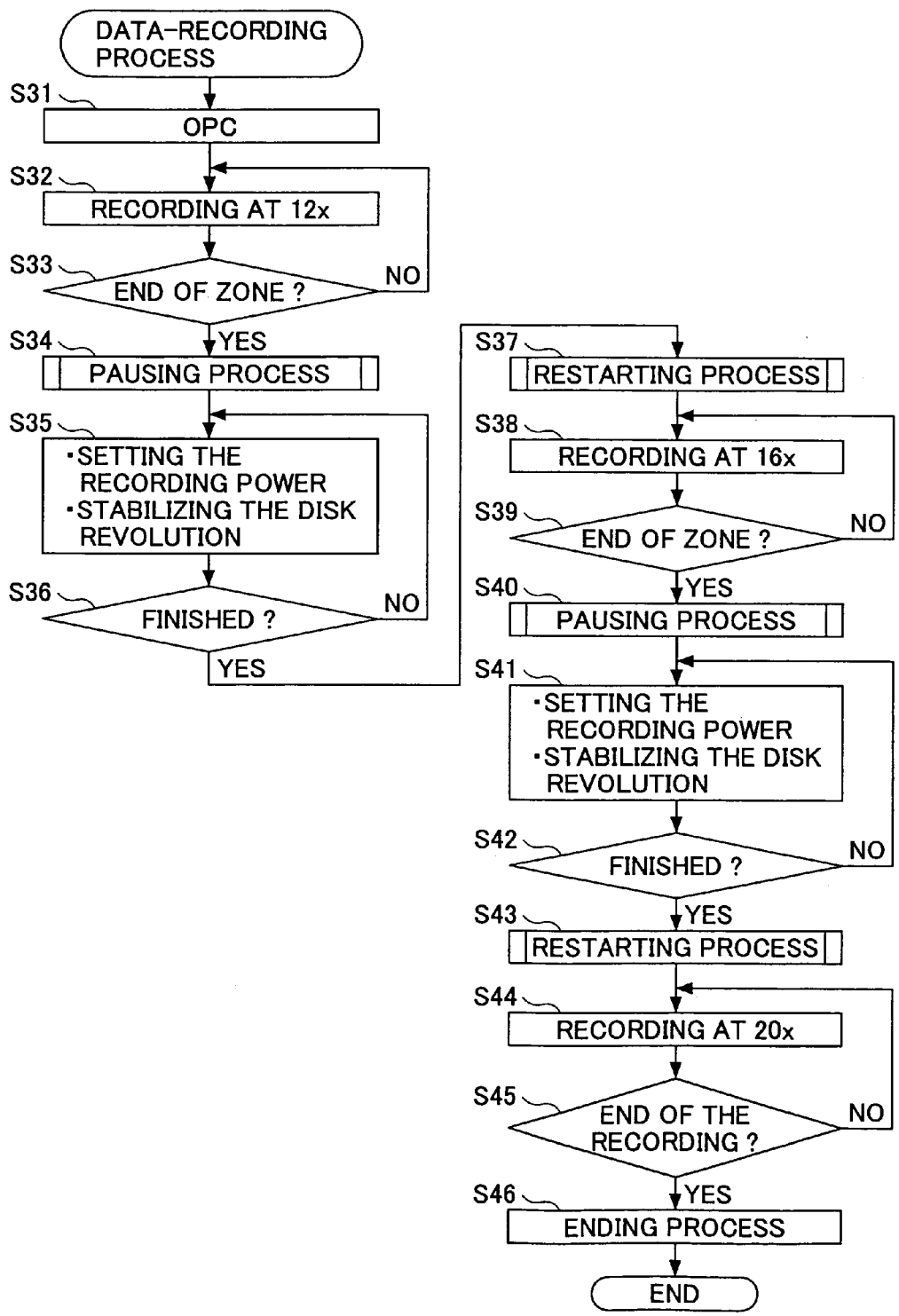
FIG. 10 is a flowchart explaining a date-recording process of the optical disk device according is to the first embodiment.

A description will be given, with reference to a flowchart shown in FIG. 10, of a series of processes performed by the CPU 17 when a date-recording is performed in the optical disk device. In each of the following steps described hereinafter, a position on the optical disk 1 at which the data-recording is performed is detected from a time or a radius on the optical disk 1, as described above. Thereby, a position detecting means and a position detecting step are realized. In addition, position information of each of the zones Z0, Z1 and Z2 is stored beforehand in the ROM 18, etc.; thereby, a zone storing means is realized. Then, it is judged which of the zones Z0, Z1 and Z2 the position detected on the optical disk 1 corresponds to by referencing the position information of each of the zones Z0, Z1 and Z2 stored in the ROM 18, etc.; thereby, a judging means and a judging step are realized.

When a data-recording is started after mounting the optical disk 1 to the optical disk device, the OPC is first performed at the recording velocity (12× in this example) in the zone Z0 at the innermost periphery so as to calculate the recording power for recording data in the zone Z0 (step S31). Thereby, a first recording-power determining means and a first recording-power determining step are realized. Then, the recording power is set to the recording power calculated in the step S31, and the recording velocity is set to 12×; then, the data-recording of the CLV method is started in the zone Z0 (step S32). When it is judged, from the time or the radius on the optical disk 1 as described above, that the data-recording has been performed to the end of the zone Z0 (Y in step S33), the pause operation is performed to the data-recording, as described above with reference to FIG. 7 (step S34). A pausing means and a pausing step are realized by the step S34.

During this pause, a revolving speed of the spindle motor 2 is increased to 16×. Also, a magnitude of the recording power in the zone Z1 is calculated by multiplying the recording power calculated in the step S31 by a constant predetermined as described above, and the recording power is set to this calculated magnitude. Thereby, a second recording-power determining means and a second recording-power determining step are realized. In addition, a revolution of the optical disk 1 is stabilized so as to be equal to the recording velocity in the zone Z1 (step S35). Thereby, a stabilizing means and a stabilizing step are realized. When the step S35 finishes stabilizing the revolution of the optical disk 1 (which can be judged by detecting the revolving speed of the spindle motor 2, etc.), and finishes setting the recording power in the zone Z1 (Y in step S36), the data-recording in the zone Z1 is restarted, as described above with reference to FIG. 8 (step S37) so as to perform the data-recording (step S38). A restarting means and a restarting step are realized by the step S37.

Likewise, when it is judged, from the time or the radius on the optical disk 1, that the data-recording has been performed to the end of the zone Z1 (Y in step S39), the pause operation is performed to the data-recording, as described above with reference to FIG. 7 (step S40). The pausing means and the pausing step are realized by the step S40.

During this pause, the revolving speed of the spindle motor 2 is increased to 20×. Also, a magnitude of the recording power in the zone Z2 is calculated by multiplying the recording power calculated in the step S31 by a constant predetermined as described above, and the recording power is set to this calculated magnitude. In addition, the revolution of the optical disk 1 is stabilized so as to be equal to the recording velocity in the zone Z2 (step S41). Thereby, the second recording-power determining means, the second recording-power determining step are realized, the stabilizing means and the stabilizing step are realized. When the step S41 finishes stabilizing the revolution of the optical disk 1, and finishes setting the recording power in the zone Z2 (Y in step S42), the data-recording in the zone Z2 is restarted, as described above with reference to FIG. 8 (step S43) so as to perform the data-recording (step S44). The restarting means and the restarting step are realized by the step S43. When it is judged that the data-recording has been performed to the end of the zone Z2 (Y in step S45), an ending operation of the data-recording is performed (step S46).

Besides, when items of disk information called Lead In and Lead Out are recorded on the optical disk 1, the information items are recorded at the respective recording velocities (Lead In at 12×; Lead Out at 16×).

[Embodiment 2]

A description will now be given of a second embodiment according to the present invention.

In the following description, elements that are identical or equivalent to the elements described in the first embodiment are referenced by the same reference marks, and will not be described in detail.

The second embodiment differs from the first embodiment in that a format is of a TAO (Track at once) or SAO (Session at once) recording, in which a data-recording is so performed as to finish a recording of one track or one session at one time, and by considering the track or the session of this case as one zone, the data-recording of the Z-CLV method is performed. Therefore, the ROM 18, etc. preliminarily stores position information of zones, by recognizing a boundary between tracks on the optical disk 1 as a boundary between the zones, in the case of TAO, and by recognizing a boundary between sessions on the optical disk 1 as a boundary between the zones, in the case of SAO. Thereby, the zone storing means is realized. Additionally, by referencing the positions (locations) of the zones stored in the ROM 18, etc., the judging step is realized.

Figure 11:
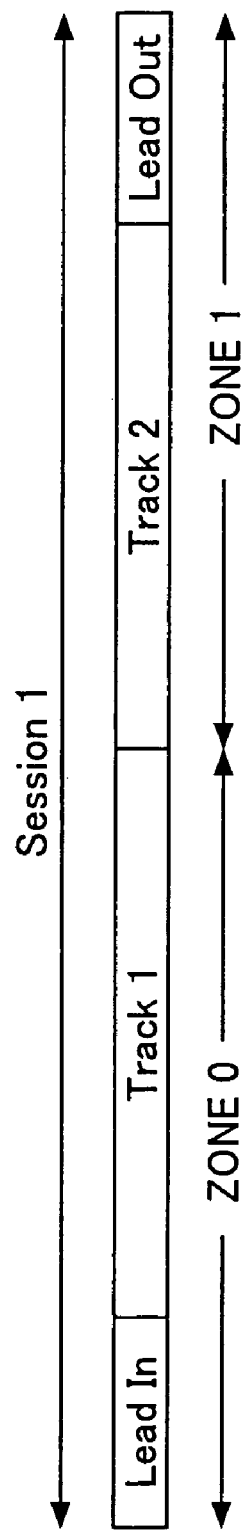
FIG. 11 is an illustration explaining a format of an optical disk used in an optical disk device according to a second embodiment of the present invention.
Figure 12:
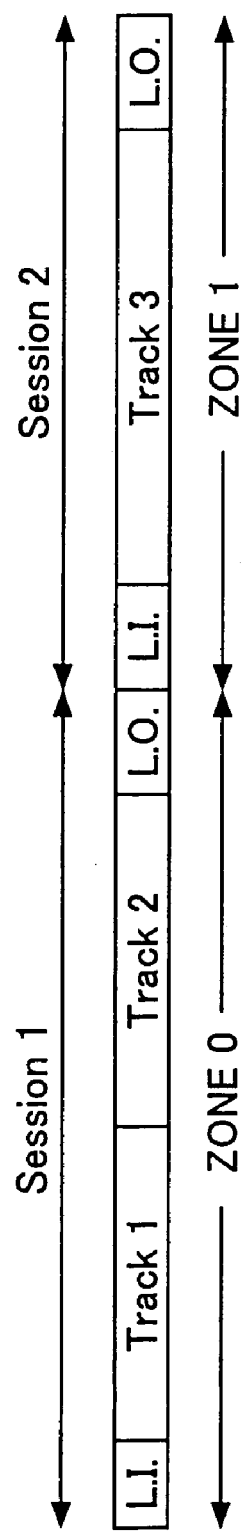
FIG. 12 is an illustration explaining another format of an optical disk used in the optical disk device according to the second embodiment of the present invention.

FIG. 11 shows an example of a zone structure of the TAO. FIG. 12 shows an example of a zone structure of the SAO. In FIG. 11, a boundary between a track 1 and a track 2 forms a boundary between zones. In FIG. 12, a boundary between a session 1 and a session 2 forms a boundary between zones. It is noted that, in FIG. 12, L.I. means Lead In, and L.O. means Lead Out.

Figure 13:
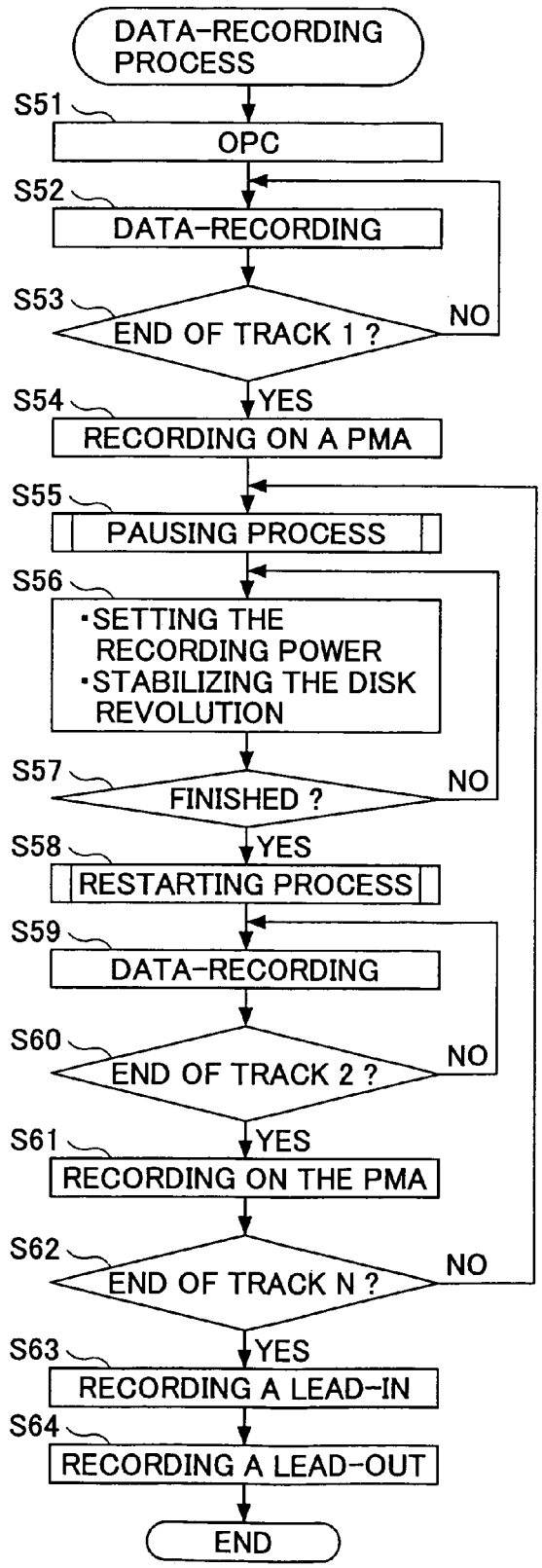
FIG. 13 is a flowchart explaining a date-recording process of the optical disk device according to the second embodiment.

A description will be given, with reference to a flowchart shown in FIG. 13, of a series of processes performed by the CPU 17 when a date-recording is performed in the optical disk device. The following description will be given in the case where the boundary between the track 1 and the track 2 forms the boundary between the zones.

When a data-recording is started after mounting the optical disk 1 to the optical disk device, the OPC is first performed at an initial velocity which is the maximum recording velocity tolerable in performing a data-recording in the track 1 which is a zone at the innermost periphery of the optical disk 1 so as to calculate the recording power for recording data in the track 1 (step S51). Thereby, the first recording-power determining means and the first recording-power determining step are realized. Then, by using the calculated recording power, the data-recording of the CLV method is performed to the track 1 (step S52). When it is judged, from the time or the radius on the optical disk 1, that the data-recording has been performed to the end of the track 1 (Y in step S53), disk information corresponding to the track 1 is continuously recorded on a PMA (Program Memory Area) (step S54), and then the pause operation is performed to the data-recording, as described above with reference to FIG. 7 (step S55). The pausing means and the pausing step are realized by the step S55.

During this pause, the revolving speed of the spindle motor 2 is stabilized so as to be equal to a recording velocity corresponding to the next track 2. Also, a magnitude of a recording power in the next track 2 is calculated by multiplying the recording power calculated in the step S51 by a constant predetermined as in the first embodiment, and the recording power is set to this calculated magnitude (step S56). Thereby, the second recording-power determining means, the second recording-power determining step, the stabilizing means and the stabilizing step are realized. When the step S56 finishes stabilizing the revolution of the optical disk 1 (which can be judged by detecting the revolving speed of the spindle motor 2, etc.), and finishes setting the recording power in the track 2 (Y in step S57), the data-recording in the track 2 is restarted, as described above with reference to FIG. 8 (step S58). The restarting means and the restarting step are realized by the step S58.

Then, by using the calculated recording power, the data-recording of the CLV method is performed to the track 2 (step S59). When it is judged, from the time or the radius on the optical disk 1, that the data-recording has been performed to the end of the track 2 (Y in step S60), disk information corresponding to the track 2 is continuously recorded on the PMA (Program Memory Area) (step S61), and then the procedure returns to the step S55 so as to repeat the steps S55 to S61 for tracks 3, 4, . . . N (N in step S62). When the data-recording is finished to the last track N (Y in step S62), the Lead In is recorded at the recording velocity on the track 1 (step S63), and the Lead Out is recorded at a recording velocity on the track N (step S64). Thereafter, the process is ended.

Besides, in the case of TAO, when disk information is recorded on the PMA or the Lead In at inner periphery after the data-recording on a track, the disk information is recorded at the recording velocity for the track at the innermost periphery or at the outermost periphery. This applies also to an optical disk device not having a pause/restart function for a data-recording.

[Embodiment 3]

A description will now be given of a third embodiment according to the present invention.

In the following description, elements that are identical or equivalent to the elements described in the first embodiment are referenced by the same reference marks, and will not be described in detail.

Figure 14:
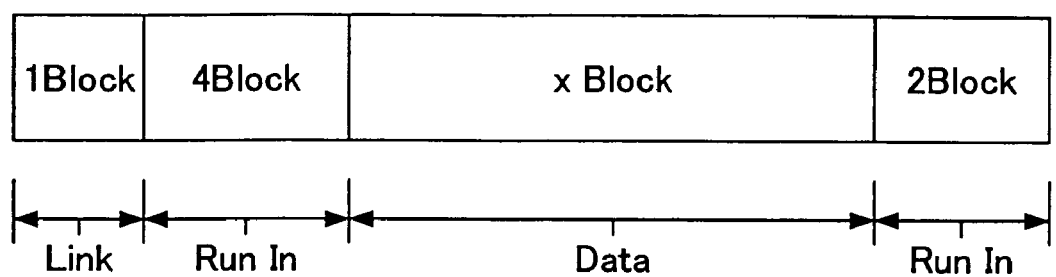
FIG. 14 is an illustration explaining a format of an optical disk used in an optical disk device according to a third embodiment of the present invention.

The third embodiment differs from the first embodiment in that a packet write is used as a format (the format is shown in FIG. 14) so as to perform a data-recording in which a recording of one packet is finished at one time, and, in this case, the Z-CLV method is realized by having a Link sector of a packet as a boundary between zones.

When a data-recording is performed in packet-writing, if a boundary between zones assumed by the optical disk device falls on the middle of packet data, changing the recording velocity by pausing/restarting at that point is not effective in terms of a recording time.

Thereupon, since a packet length has a limit, a certain width (approximately one packet length) is first provided for the boundary between the zones assumed by the optical disk device so as to make a Link sector a boundary between zones, the Link sector being meaningless as data.

Making the Link sector a boundary between zones can also shorten a data recording time. Also, the optical disk device can realize the Z-CLV recording without the function of precisely performing a pause/restart of a data-recording as described in the first embodiment with reference to the circuit diagram shown in FIG. 5 and other illustrations.

[Embodiment 4]

A description will now be given of a fourth embodiment according to the present invention.

In the following description, elements that are identical or equivalent to the elements described in the first embodiment are referenced by the same reference marks, and will not be described in detail.

The fourth embodiment differs from the first embodiment in that a P-CAV (Partial CAV) method shown in FIG. 2-(d) is employed in place of the Z-CLV method. In the P-CAV method, a data-recording is started from the inner periphery of the optical disk 1 in a CAV (Constant Angular Velocity) method, and at a certain point, the CAV method is switched to the CLV method.

In the conventional CAV method shown in FIG. 2-(b), a data-recording is performed at a constant angular velocity, in which the average recording velocity is the largest. This CAV method has not yet been used in general, because the CAV method has many problems as follows: a laser power required for a recording varies continuously, making the control thereof difficult; a recording signal frequency varies continuously within the optical disk 1, complicating the generation of a recording pulse; etc. However, as mentioned above, since this method is the fastest data-recording method, this method is expected to be widespread, if these problems are solved.

However, even if an optical disk device has a CAV recording function, a recording error occurs in a data-recording due to a buffer-underrun when a transfer of record data from a host computer cannot keep up with the data-recording. A recording error also occurs in a case of a servo error in which a tracking servo and a focus servo come out of place during a data-recording due to an impact or a vibration inflicted from outside. A recording error also occurs when the ATIP on the optical disk 1 cannot be read (i.e., when an ATIP error rate becomes high). A recording error also occurs when the temperature of the laser diode of the optical pickup 5 rises so high as to deteriorate the quality of a data-recording.

Causes of such recording errors as a buffer-underrun can be avoided by performing a pause on a data-recording as described in the first embodiment with reference to FIG. 7. However, when a data-recording is performed in the CAV method, the recording velocity becomes higher as the data-recording proceeds towards the outer periphery of the optical disk; therefore, once a pause occurs during a data-recording, there is a high likelihood that pauses occur continually later on.

Thereupon, when a pause operation to avoid such recording errors as a buffer-underrun occurs predetermined times, a recording mode is changed from the CAV method to the CLV method upon restarting from the pause state. The recording velocity of the CLV method is arranged to be equal to a velocity immediately before the pause or a velocity one-step lower than the velocity immediately before the pause so as to curb the possibility that a pause occurs thereafter, realizing the highest possible recording velocity.

Figure 15:
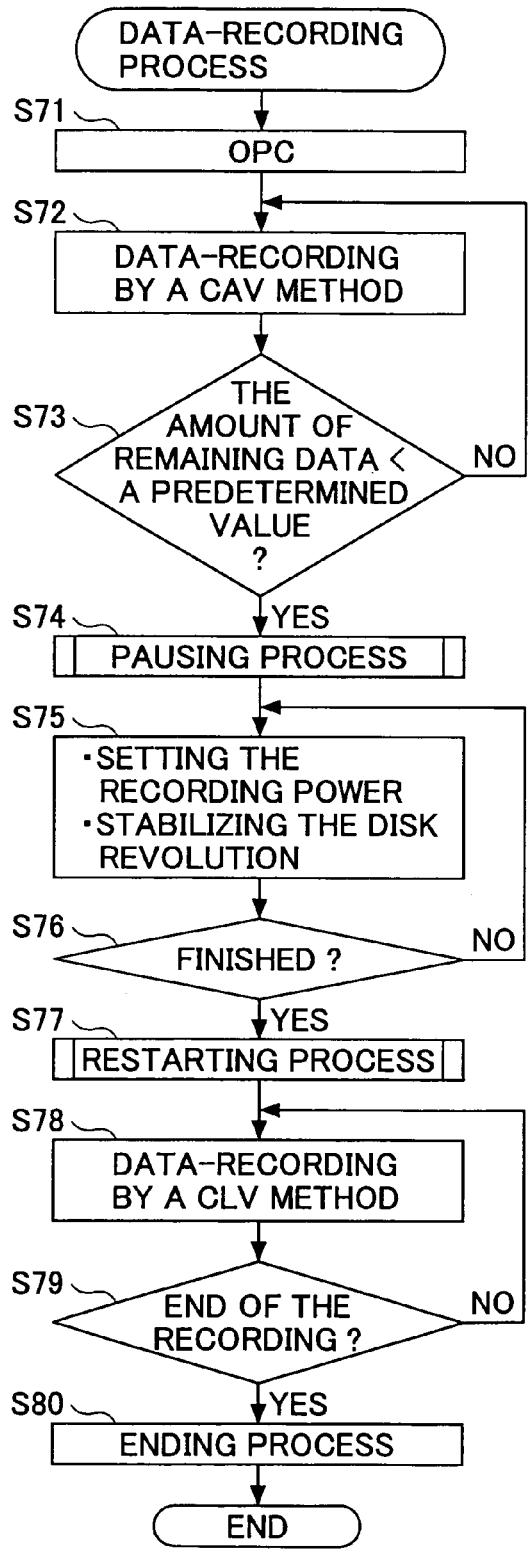
FIG. 15 is a flowchart explaining a date-recording process of an optical disk device according to a fourth embodiment of the present invention.

FIG. 15 is a flowchart showing a series of processes performed by the CPU 17 when a date-recording is performed in an optical disk device employing this P-CAV method. The following description will be given in the case where a buffer-underrun causes a recording error.

As shown in FIG. 15, when a data-recording is started after mounting the optical disk 1 to the optical disk device, the OPC is first performed at an initial recording velocity of 8× so as to calculate an initial value of a recording power for performing the data-recording (step S71). Thereby, a first recording-power determining means and a first recording-power determining step are realized. Then, by using the calculated initial value of the recording power, the data-recording by the well-known CAV method is started to the optical disk 1 at the initial recording velocity of 8× with a constant recording density (step S72). Thereby, a first controlling means and a first recording step are realized. The recording velocity and the recording power in this case are controlled in the same manner as in the well-known CAV method. When the amount of data remaining in the buffer RAM 10 becomes smaller than a predetermined value during the data-recording (Y in step S73), the pause operation is performed to the data-recording, as described above with reference to FIG. 7 (step S74). A detecting means and a detecting step are realized by the judgment in the step S73, and a pausing means and a pausing step are realized by the step S74.

When this pause operation is performed, the revolving speed of the spindle motor 2 is stabilized so as to be equal to or lower than a recording velocity immediately before the pause. In addition, the recording power is set to a value obtained by multiplying the initial value of the recording power at the initial recording velocity of 8× by a constant corresponding to the next recording velocity (the constant is obtained beforehand in manufacturing processes, as described with reference to FIG. 9) (step S75). Thereby, a second recording-power determining means and a second recording-power determining step are realized. For example, when a data-recording is started at 8×, and a pause occurs to avoid a buffer-underrun during the data-recording at approximately 13×, the recording velocity is decreased to 12×, for example.

Then, when the step S75 finishes stabilizing the revolution (the revolving speed) of the spindle motor 2, and finishes setting the recording power (Y in step S76), the restart operation is performed, as described above with reference to FIG. 8 (step S77). Thereafter, the data-recording by the CLV method is performed at the recording velocity and the recording power set in the step S75 (step S78). A recording density at this point is made to be the same as in the CAV method in the step S72. A second controlling means and a second recording step are realized by the step S77 and the step S78. When the data-recording is completed (Y in step S79), an ending operation of the data-recording is performed (step S80).

Additionally, the above-described embodiment may be arranged as follows: when the amount of data remaining in the buffer RAM 10 becomes smaller than the predetermined value, the pause operation is performed to the data-recording, as described above with reference to FIG. 7; then, when the amount of data remaining in the buffer RAM 10 is restored to an amount equal to or larger than the predetermined value, the data-recording of the CAV method on the same conditions as before the pause is restarted; and after these processes are repeated predetermined times, the process in the above-described step S73 is performed for the first time. A restarting means and a restarting step are realized by the above-mentioned processes from the pausing to the restarting in this arrangement.

[Embodiment 5]

A description will be given of a fifth embodiment according to the present invention.

Figure 16:
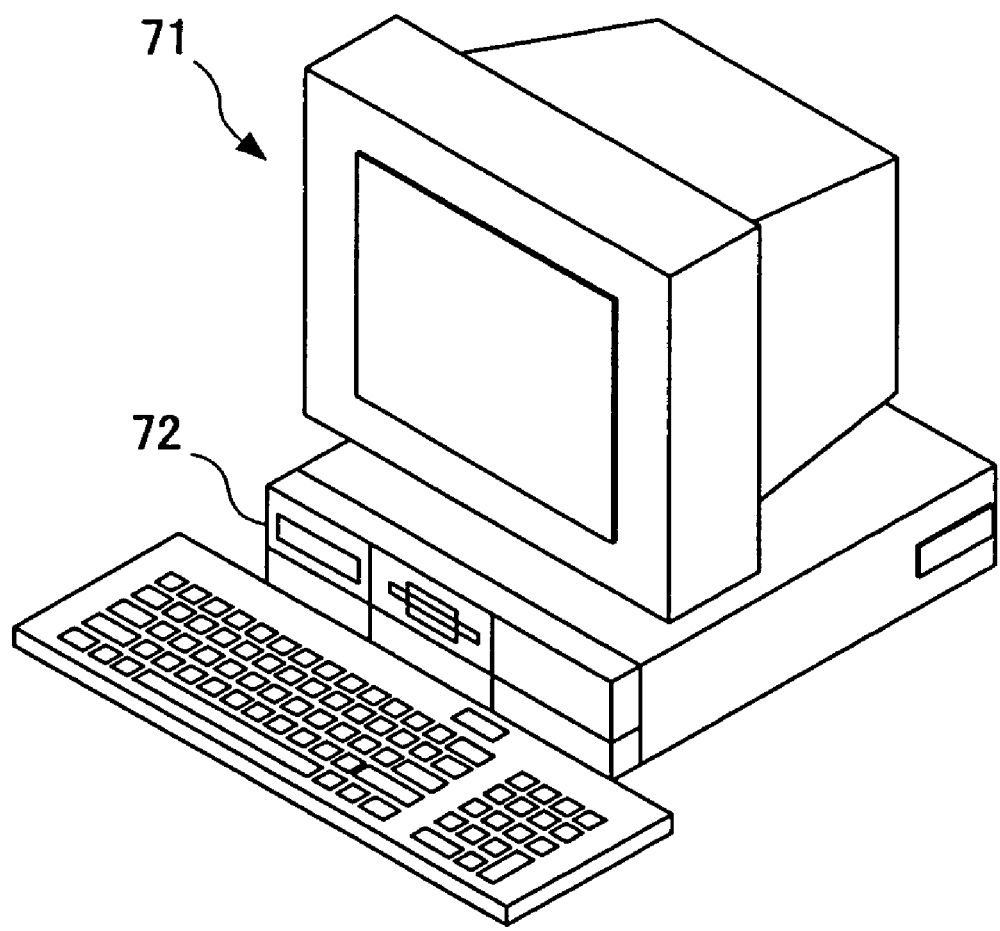
FIG. 16 is a perspective view of an information processing device according to a fifth embodiment of the present invention.

FIG. 16 shows a personal computer (PC) 71 according to the fifth embodiment, which is an information processing device according to the present invention. As shown in FIG. 16, the PC 71 comprises an optical disk device 72 according to one of the first to fourth embodiments of the present invention. The PC 71 can record data on the optical disk 1 by using this optical disk device 72.

[Embodiment 6]

A description will be given of a sixth embodiment according to the present invention.

Figure 17:
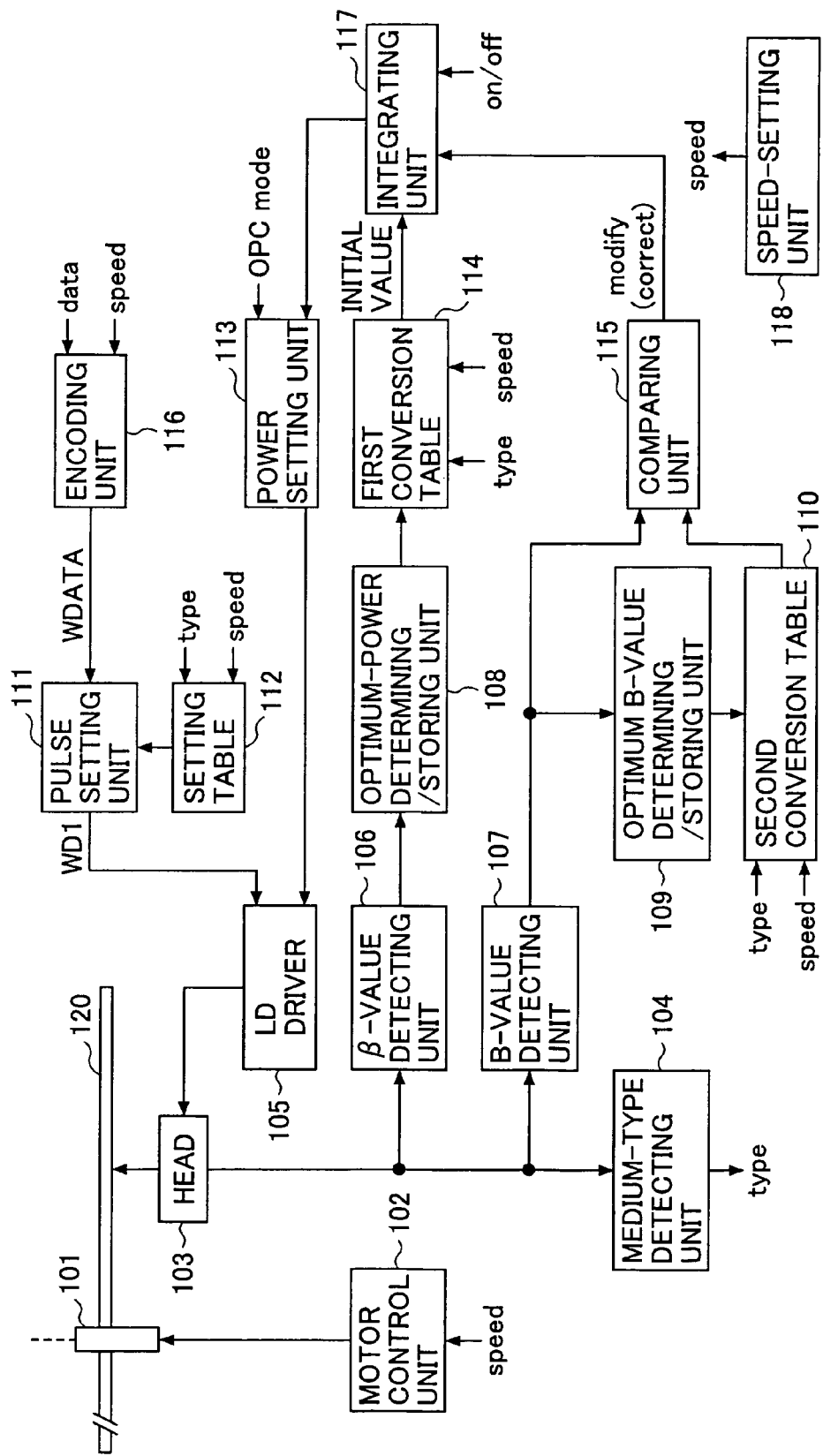
FIG. 17 is a block diagram showing a structure of an optical disk recording device according to a sixth embodiment of the present invention.

An optical disk recording device shown in FIG. 17 is an information recording device for a CD-R drive or a CD-RW drive, which is realized by a microcomputer including a CPU, a ROM and a RAM. The optical disk recording device writes (records) information in a circumferential direction of a disk-type recording medium with a substantially constant linear density. A block diagram shown in FIG. 17 shows all elements related to the present embodiment.

An optical disk 120 is a disk-type recording medium such as a CD-R disk or a CD-RW disk, and is revolved by a revolving motor 101.

The revolving motor 101 revolves at a predetermined velocity under a revolution control by a motor control unit 102. In this embodiment, the revolving motor 101 revolves at a CLV (Constant Linear Velocity) changeable by a velocity command "speed".

A head 103 converges light beams on a recording layer of the optical disk 120 so as to form a record mark thereon. The head 103 is movable in a radial direction of the optical disk 120, and can access a test-writing area and a user data area preliminarily provided on the optical disk 120.

A light source (not shown in the figure) is mounted to the head 103. In general, a semiconductor laser light source (LD: Laser Diode) is used as the light source.

This LD is modulated to a predetermined recording power state by an LD driver 105 according to an input pulse signal (a record pulse) WD1. The LD is modulated between the recording power state and a space power state so that the record marks and other parts are formed on the optical disk 120. When reproducing this optical disk 120, a difference in reflectance occurs so that an information signal is reproduced.

In such a nonreversible organic dye medium as the CD-R disk, the above-mentioned record mark is a pit, and other parts are referred to as space.

A power setting unit 113 drives the LD driver according to a recording power command (an output signal from an integrating unit 117) so as to lighten the LD of the head 103 by a power thereof. When an OPC mode command is supplied to the power setting unit 113, the power setting unit 113 is brought into a test-writing mode, regardless of the recording power command, in which mode the power setting unit 113 performs a test-writing and changes the recording power step by step.

Record data "data" is encoded and modulated in a predetermined format in an encoding unit 116, and is output in a serial format as a record data row "WDATA" at a velocity corresponding to a recording velocity according to the velocity command "speed".

Figure 18:
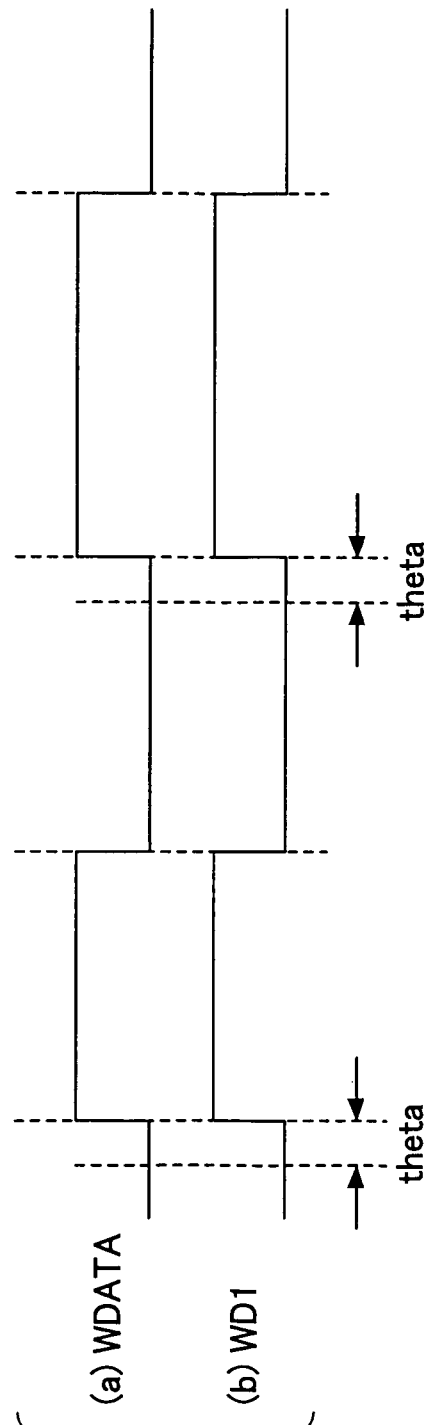
FIG. 18 is a graph for explaining a process of converting a record data row into a record pulse in a pulse setting unit shown in FIG. 17.

The above-mentioned record data row "WDATA" is converted into a record pulse by a pulse setting unit 111. The converting process is preferably a process changing a record pulse width. For example, as shown in FIG. 18, the record data row "WDATA" is converted into the record pulse WD1 so that a rising edge of the record pulse WD1 indicated by FIG. 18-(b) is shifted forth by "theta" with respect to the record data row "WDATA" indicated by FIG. 18-(a).

This "theta" may be an equal amount for all rising edges. However, this "theta" may also be set to different amounts according to a High width (i.e., a record mark length). For example, as the High width becomes shorter, the "theta" may be set to a larger amount so that a recording sensitivity for the shorter record mark can be corrected.

The above-mentioned record pulse width may be fixedly set. However, it is more preferable that the record pulse width is set according to a linear velocity or a type of the optical disk, because this can compensate the difference in a recording sensitivity for each record mark varied according to a linear velocity or a type of the optical disk.

An identification code indicating a type of the optical disk 120 is detected in a medium-type detecting unit 104 from a reproduction signal obtained by reproducing a certain area of the optical disk 120 by the head 103. This type may be maker-specific if the maker of the optical disk can be specified in a certain method, and more preferably, this type may be further classified into smaller categories under the specified maker.

Other type-identifying manners include such an identification code as various parameters embedded (recorded) preliminarily in the optical disk 120. For example, when a recommended power or a pulse width is embedded, this recommended power or the pulse width may be used. Alternatively, a specific maker-identifying code may be embedded for each optical disk maker. Further, a code for a further smaller classification may be embedded.

Thereby, an optimum record pulse width can be set in accordance with various recording layers of a same maker.

In the present embodiment, A β-value detecting unit 106, an optimum-power determining/storing unit 108, and the power setting unit 113 together with other elements function as a test-writing means for performing a test-writing to a predetermined area on the disk-type recording medium at a predetermined basic linear velocity so as to determine an optimum recording power at the basic linear velocity according to the result of the test-writing.

When performing a recording on the disk-type recording medium at a linear velocity different from the predetermined basic linear velocity, the above-mentioned power setting unit 113 and the integrating unit 117 together with other elements function as a recording-power setting means for setting a recording power according to the result of a predetermined calculation performed to the optimum recording power at the basic linear velocity.

The above-mentioned optimum-power determining/storing unit 108 functions as an optimum recording-state storing means for storing a value in accordance with the reproduction signal from the disk-type recording medium to which a recording is performed with the optimum recording power, as an optimum recording-state targeted value (a beta target).

When performing a recording on the disk-type recording medium at a linear velocity different from the predetermined basic linear velocity, the above-mentioned optimum-power determining/storing unit 108 functions as a recording-state targeted value setting means for setting a recording-state targeted value according to the result of a predetermined calculation performed to the optimum recording-state targeted value.

A B-value detecting unit 107, an optimum B-value determining/storing unit 109, a comparing unit 115, the integrating unit 117, and the power setting unit 113 together with other elements function as a power correcting means for correcting a recording power according to the result of a comparison between the recording-state targeted value and the value in accordance with the reproduction signal from the disk-type recording medium during a recording of information to the disk-type recording medium.

The above-mentioned medium-type detecting unit 104, a first conversion table 114, a second conversion table 110, and the integrating unit 117 together with other elements function as an operational expression/coefficient setting means for setting an operational expression or a coefficient used in a predetermined calculation in accordance with a type of the disk-type recording medium.

The above-mentioned medium-type detecting unit 104 together with other elements function as a medium-type judging means for judging a type of the disk-type recording medium according to an identification code embedded in the disk-type recording medium.

The above-mentioned pulse setting unit 111 and a setting table 112 together with other elements function as a first record-pulse-width changing means for changing a record pulse width according to a linear velocity, and also function as a second record-pulse-width changing means for changing a record pulse width according to a linear velocity or a type of the disk-type recording medium.

Next, a description will be given of a test-writing process in this optical disk recording device.

The test-writing process is a process of determining a recording power that provides an optimum recording state, by performing a recording at a certain linear velocity with changing a recording power step by step, and thereafter reproducing the recorded part so as to estimate a recording state thereof.

This optical disk recording device can perform a recording with changing a recording power step by step by setting the power setting unit 113 in an OPC mode. In this course, a linear velocity becomes a predetermined basic linear velocity according to a speed (velocity) set in a speed-setting unit 118. The test-writing is performed in a PCA area (a Power Calibration Area) on the optical disk 120, generally being inside a user area.

After recording on the PCA area, a reproduction signal RF is obtained by reproducing the recorded part by using a light beam projected from the LD of the head 103.

By measuring and evaluating a proper parameter of this reproduction signal RF, the optimum recording state can be evaluated. For example, the β-value detecting unit 106 measures a β-value as the parameter. The β-value detecting unit 106 removes a low-frequency component of the reproduction signal RF (an AC coupling) so as to detect an upper envelope level a and a lower envelope level b, as shown in FIG. 19.

Figures 19, 20:
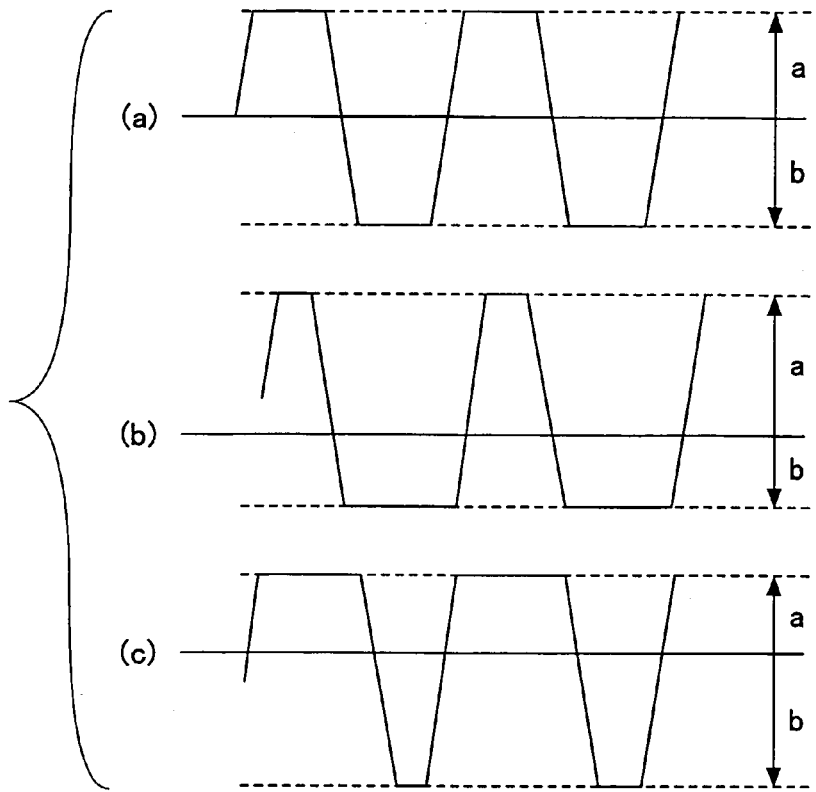
FIG. 19 is a graph showing an upper envelope and a lower envelope of a low-frequency component removed from a reproduction signal in a β-value detecting unit shown in FIG. 17.
FIG. 20 is a table showing a β-value and a B-value for each recording power.

As a characteristic of the recording layer of the optical disk 120, when it is assumed that a reflectance becomes low at a record-mark part, and that the reproduction signal RF becomes low-level at the low-reflectance part, the reproduction signal RF AC-coupled in a correct recording state becomes vertically symmetrical as shown in FIG. 19-(a), in which a=b.

When the recording power is excessively large, the record-mark part becomes long so that the upper level becomes tall when AC-coupled as shown in FIG. 19-(b), in which a>b. When the recording power is insufficient, the record-mark part becomes short so that the lower level becomes tall when AC-coupled as shown in FIG. 19-(c), in which a<b.

Then, the β-value is an amount obtained by normalizing the difference between the above-mentioned upper envelope level a and the lower envelope level b by an RF amplitude (a+b). That is, $\beta=(a-b)/(a+b)$.

Here, when the β-value is large, that means the recording power is excessively large, and when the β-value is small, that means the recording power is insufficient. The optimum recording power is achieved when the β-value becomes a certain value (for example, approximately 4%). The β-value having this certain value is called "beta target". When a test-writing is performed by changing the recording power from 10 mW to 19 mW by 1 mW, assuming the beta target is approximately 4%, the β-values corresponding to the recording powers obtained by reproducing the recorded part of the test-writing become as shown in a list in FIG. 20.

Figures 21, 22:
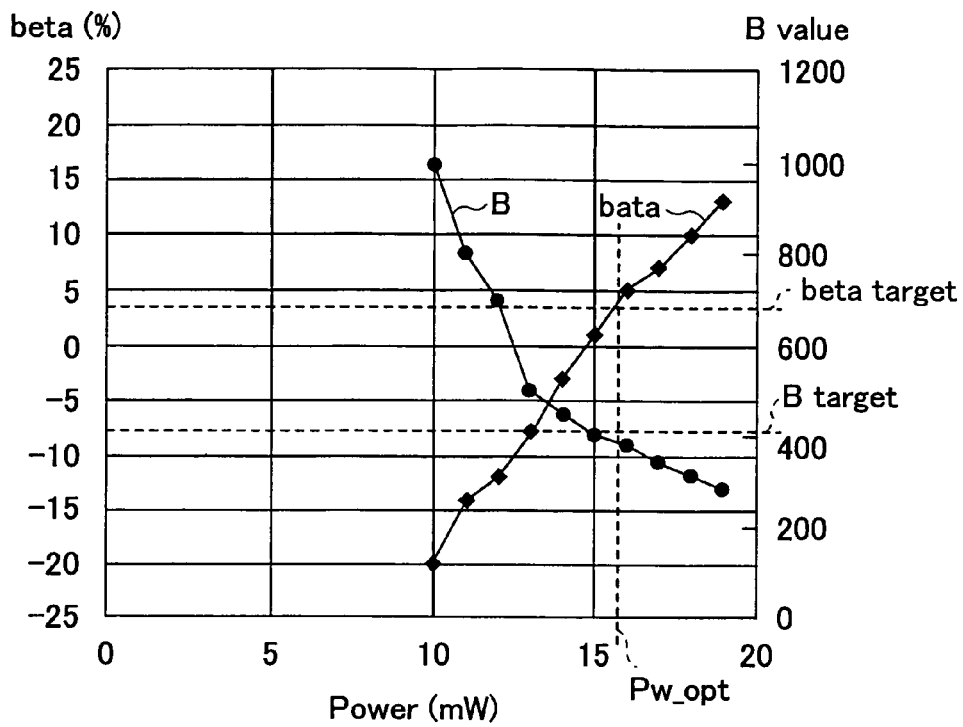
FIG. 21 is a graph showing changes of the β-value and the B-value for each recording power shown in FIG. 20.
FIG. 22 shows a table of a disk type, a velocity, coefficients, and a "theta"

FIG. 21 is a graph showing the relationship between the recording powers Pw and the β-values shown in FIG. 20. In FIG. 21, the abscissa axis indicates the recording power, and the curve extending to the top right indicates the β-value. The recording power corresponding to a point where this β curve crosses a dotted line indicating the beta target is the optimum recording power (Pw_opt).

The optimum-power determining/storing unit 108 determines the optimum recording power by the above-described process.

The above-mentioned beta target may be a fixed value (for example, 4%). However, it is more preferable that the beta target is set according to a type of the optical disk. This disk type is specified by a detection result of the medium-type detecting unit 104, as described above.

When the optimum-power determining/storing unit 108 determines the optimum recording power, the optimum-power determining/storing unit 108 stores the optimum recording power in a storage therein, and sets the optimum recording power in the power setting unit 113 upon recording user data.

This optimum recording power is an optimum recording power at the linear velocity at which the test-writing is performed. As described in the foregoing, a high-speed optical disk recording device performs a recording at a larger linear velocity as the recording proceeds to the outer periphery of the optical disk 120. However, achieving such a large linear velocity in the PCA area is not preferable because the revolution of the disk becomes too fast (i.e., the angular velocity becomes too high).

Therefore, the optimum recording power determined by performing the test-writing process can be corrected by a certain calculation rule for different linear velocities.

As an example, a description will be given in a case where a test-writing is performed at a 12-fold velocity (12×; 1× is 150 Kbyte/sec) of a CD so as to obtain an optimum recording power Pwopt12.

Recording powers Pwopt16, Pwopt20 and Pwopt24 at different linear velocities 16× (16-fold), 20× (20-fold) and 24× (24-fold), respectively, are obtained by predetermined operational expressions as follows, in which Pwopt12 is multiplied by a predetermined coefficient F1.

$Pwopt12 = 1.00 \times Pwopt12$ $Pwopt16 = 1.10 \times Pwopt12$ $Pwopt20 = 1.15 \times Pwopt12$ $Pwopt24 = 1.20 \times Pwopt12$ A calculation rule of such operational expressions may be a constant multiplication as above, or may be a constant addition. Also more complicated expressions may be used as a function of the linear velocity.

The above-mentioned predetermined coefficient may be fixed. However, it is more preferable that the coefficient is set according to a type of the optical disk. This disk type is specified by a detection result of the medium-type detecting unit 104, as described above.

FIG. 22 shows an example of a table of the above-mentioned coefficients F1 corresponding to types of the optical disk.

The first conversion table 114 converts the optimum recording power into an optimum recording power at a desired linear velocity by a converting process based on this table.

This optimum recording power is supplied to the integrating unit 117 as an initial value. In a case where a running OPC process (described hereinbelow) is not performed, an on/off command is turned off so as not to perform an integration. In this case, the integrating unit 117 maintains the initial value. Subsequently, the initial value is supplied to the power setting unit 113. Accordingly, a recording is performed with the optimum recording power obtained in the first conversion table 114.

Next, a description will be given of the running OPC process in this optical disk recording device.

The optimum recording power obtained by the test-writing (and the recording power converted therefrom according to a velocity) will not necessarily remain optimum when there occur a change in sensitivity within a medium, a change in sensitivity due to the temperature, a change in the recording power due to an error in controlling the laser power, a change in sensitivity due to a wavelength change, etc. during a recording.

Thereupon, the running OPC process monitors a reproduction signal during a recording and detects a recording state of the recording layer of the optical disk 120 so as to correct the recording power.

In the running OPC process, a value obtained by, for example, normalizing a level of the reproduction signal during a recording by the recording power is considered as a B-value (a recording-state targeted value). This is detected by the B-value detecting unit 107.

First, a B-value is measured in performing the test-writing. Thereafter, when the optimum recording power is obtained by evaluating the β-value, the optimum B-value determining/storing unit 109 stores the B-value corresponding to the optimum recording power as a targeted B-value (an optimum recording-state targeted value).

Then, during a recording of user data, a B-value is monitored so as to compare the B-value with the targeted B-value in the comparing unit 115. The result of the comparison is integrated in the integrating unit 117 so as to correct (modify) the setting of the recording power to the power setting unit 113. In this course, the on/off command is turned on so as to perform the integration.

When the above-mentioned comparison result remains "0", i.e., the detected B-value is equal to the targeted B-value, the integrating unit 117 maintains the initial value.

That is, the recording is performed with the original optimum recording power (or the optimum converted power thereof). This is a case when the recording state remains excellent. On the other hand, when the comparison result becomes not "0", the integrating unit 117 corrects the recording power. When a polarity of the integration has been so set as to increase a recording power when the comparison result indicates an insufficiency of the recording power, the recording power will always be corrected so as to make the recording state excellent.

In this process, too, the targeted B-value is converted by a certain calculation rule according to linear velocities different from the linear velocity at which the test-writing is performed.

In this calculation example, the test-writing is performed at a 12-fold velocity (12×) so as to obtain a targeted B-value B12. Targeted B-values B16, B20 and B24 at different linear velocities 16× (16-fold), 20× (20-fold) and 24× (24-fold), respectively, are obtained by constant multiplications as follows, in which B12 is multiplied by a corresponding constant (a coefficient F2).

$B12 = 1.00 \times B12$ $B16 = 1.10 \times B12$ $B20 = 1.20 \times B12$ $B24 = 1.30 \times B12$ A calculation rule here may be a constant multiplication as above, or may be a constant addition. Also more complicated expressions may be used as a function of the linear velocity.

Coefficients in these expressions may be fixed. However, it is more preferable that the coefficient is set according to a type of the optical disk. This disk type is specified by a detection result of the medium-type detecting unit 104, as described above.

The table in FIG. 22 also shows examples of the coefficients F2 corresponding to types of the optical disk. The second conversion table 110 converts the targeted B-value into a targeted B-value at a desired linear velocity by a calculation based on this table.

Thus, targeted B-values at different linear velocities are appropriately calculated and set, based on a targeted B-value at a linear velocity in a test-writing.

Figure 23:
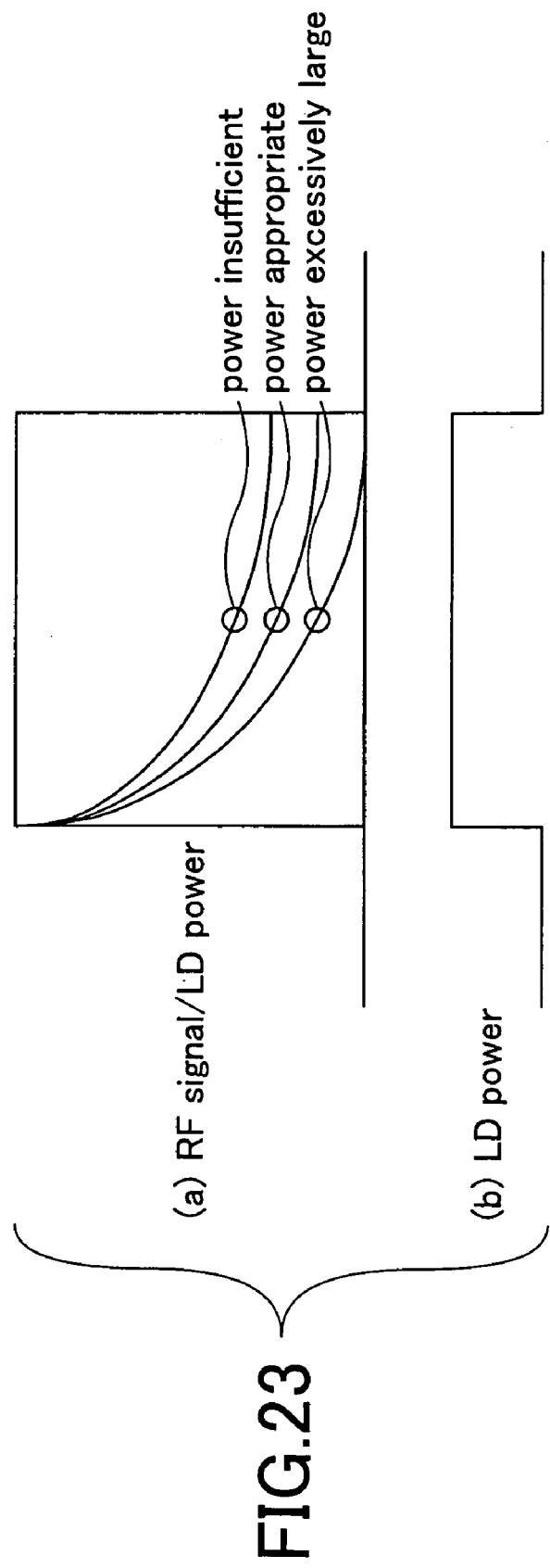
FIG. 23 is a graph for explaining a process of detecting the B-value in a B-value detecting unit shown in FIG. 17.

Next, a description will be given, with reference to FIG. 23, of a detecting process of the B-value.

The reproduction signal RF during a recording becomes high-level the moment the laser of the LD starts lightening by the recording power, because the laser power (LD power) corresponding to the recording power is reflected substantially completely.

However, as the record marks are beginning to be formed, the reflectance falls so that the reflective level gradually decreases. Thereupon, when the power is increased, the record marks are beginning to be formed still earlier so that the reflective level decreases more. Therefore, in order to cancel the influence of the power per se to the reflective level, it is preferable that the reproduction signal RF is divided by the recording power. A value obtained by sampling the division result of "RF/power" at a proper time during the recording is used as the B-value. It is noted that the above-mentioned value obtained by sampling may not necessarily used, but an average value of the division results of "RF/power" may be used.

In short, as long as the formation of the record marks is taken into account so that values monotonous (uniform) to some extent (near the optimum power) can be detected, any types of the detecting process are applicable.

The medium-type detecting unit 104 comprises a conversion table as shown in FIG. 24, in which recording parameter (strategy type) numbers are assigned to ID codes of manufacturers such as makers of the optical disk 120 and type codes of the optical disk 120. These recording parameter numbers are used as types in the above-mentioned settings and conversion tables (such as in FIG. 22).

In FIG. 24, the recording parameter numbers are not assigned in serial numbers uniquely to the type codes (0, 1, 2, . . . ) of the manufacture IDs (A corporation, B corporation, . . . ), because the same recording parameter number is used for recording layers having an analogous characteristic so as to decrease the size of the conversion table.

As described above, this optical disk recording device can accurately determine the recording power and other recording conditions even at a linear velocity different from a linear velocity in a test-writing so as to perform a high-quality recording even at a high-speed area.

The present invention is not limited to the specifically disclosed embodiments, and variations and modifications may be made without departing from the scope of the present invention.

The present application is based on Japanese priority applications No. 2000-241958 filed on Aug. 10, 2000 and No. 2000-363383 filed on Nov. 29, 2000, the entire contents of which are hereby incorporated by reference.

What is claimed is:

1. An information recording device writing information in a circumferential direction of a disk-type recording medium with a substantially constant linear density, the device comprising:

test-writing means for performing a test-writing in a predetermined area on said disk-type recording medium at a predetermined basic linear velocity so as to determine an optimum recording power at said basic linear velocity according to a result of said test-writing; and recording-power setting means for setting a recording power according to a result of a predetermined calculation performed to said optimum recording power, when a recording is performed on said disk-type recording medium at a linear velocity different from said predetermined basic linear velocity; and wherein said test-writing means includes optimum recording-state storing means for storing a value in accordance with a reproduction signal reproduced from said disk-type recording medium as an optimum recording-state targeted value, when a recording is performed on said disk-type recording medium with said optimum recording power; and said recording-power setting means includes: recording-state targeted value setting means for setting a recording-state targeted value according to a result of a predetermined calculation performed to said optimum recording-state targeted value, when the recording is performed on said disk-type recording medium at the linear velocity different from the predetermined basic linear velocity; and power correcting means for correcting said recording power by comparing said recording-state targeted value with said value in accordance with a reproduction signal reproduced from said disk-type recording medium during a recording of information to said disk-type recording medium.

2. The information recording device as claimed in claim 1, including operational expression/coefficient setting means for setting at least one of an operational expression and a coefficient performing said predetermined calculation, in accordance with a type of said disk-type recording medium.

3. The information recording device as claimed in claim 2, including record-pulse-width changing means for changing a record pulse width according to at least one of said linear velocity different from said predetermined basic linear velocity and the type of said disk-type recording medium.

4. The information recording device as claimed in claim 2, including medium-type judging means for judging the type of said disk-type recording medium according to an identification code embedded in said disk-type recording medium.

5. The information recording device as claimed in claim 4, including record-pulse-width changing means for changing a record pulse width according to at least one of said linear velocity different from said predetermined basic linear velocity and the type of said disk-type recording medium.

6. The information recording device as claimed in claim 1, including record-pulse-width changing means for changing a record pulse width according to said linear velocity different from said predetermined basic linear velocity.

* * * * *

UNITED STATES PATENT AND TRADEMARK OFFICE
CERTIFICATE OF CORRECTION

PATENT NO. : 6,987,717 B2
APPLICATION NO. : 09/923540
DATED : January 17, 2006
INVENTOR(S) : Kei Hagiwara et al.

It is certified that error appears in the above-identified patent and that said Letters Patent is hereby corrected as shown below:

On the Title Page, In Item (75) Inventors: delete "Kei Hagiwara".

Item (12) "Hagiwara et al." should read --Suzuki--.

Signed and Sealed this

Twelfth Day of September, 2006

JON W. DUDAS
*Director of the United States Patent and Trademark Office*